(12) United States Patent
MacKinnon et al.

(10) Patent No.: US 9,644,277 B2
(45) Date of Patent: May 9, 2017

(54) REACTANT FLOW CHANNELS FOR ELECTROLYZER APPLICATIONS

(71) Applicant: POWERDISC DEVELOPMENT CORPORATION LTD., Chilliwack (CA)

(72) Inventors: Sean Michael MacKinnon, Vancouver (CA); Matthew Paul Paone, Burnaby (CA); Raoul Jacob Kingma, Langley (CA); Greg John Montie, Surrey (CA)

(73) Assignee: Loop Energy Inc., Chilliwack (CA)

( * ) Notice: Subject to any disclaimer, the term of this patent is extended or adjusted under 35 U.S.C. 154(b) by 77 days.

(21) Appl. No.: 14/683,450

(22) Filed: Apr. 10, 2015

(65) Prior Publication Data

US 2015/0211132 A1    Jul. 30, 2015

Related U.S. Application Data

(63) Continuation of application No. PCT/CA2013/050769, filed on Oct. 10, 2013, and a
(Continued)

(51) Int. Cl.
*H01M 2/38* (2006.01)
*C25B 1/06* (2006.01)
(Continued)

(52) U.S. Cl.
CPC ............... *C25B 1/06* (2013.01); *C25B 1/10* (2013.01); *C25B 9/18* (2013.01); *H01M 8/026* (2013.01);
(Continued)

(58) Field of Classification Search
CPC ......... H01M 2008/1095; H01M 8/026; H01M 8/0265; H01M 8/2465; H01M 8/0258;
(Continued)

(56) References Cited

U.S. PATENT DOCUMENTS

| 6,048,633 A | 4/2000 | Fujii et al. |
| 6,406,809 B1 | 6/2002 | Fujii et al. |

(Continued)

FOREIGN PATENT DOCUMENTS

| CA | 2437892 A1 | 8/2002 |
| CA | 2787467 A1 | 7/2011 |

(Continued)

OTHER PUBLICATIONS

Bonghwan et al., "Dynamic Simulation of PEM Water Electrolysis and Comparison with Experiments", Int. J. Electrochem. Sci., 2013, pp. 235-248, vol. 8.
(Continued)

*Primary Examiner* — Patrick Ryan
*Assistant Examiner* — Ben Lewis
(74) *Attorney, Agent, or Firm* — Corridor Law Group, P.C.

(57) ABSTRACT

An electrolyzer or unitized regenerative fuel cell has a flow field with at least one channel, wherein the cross-sectional area of the channel varies along at least a portion of the channel length. In some embodiments the channel width decreases along at least a portion of the length of the channel according to a natural exponential function. The use of this type of improved flow field channel can improve performance and efficiency of operation of the electrolyzer device.

21 Claims, 25 Drawing Sheets

Related U.S. Application Data continuation-in-part of application No. PCT/CA2013/050626, filed on Aug. 14, 2013, and a continuation-in-part of application No. PCT/CA2013/050627, filed on Aug. 14, 2013, application No. 14/683,450, which is a continuation-in-part of application No. 14/622,830, filed on Feb. 14, 2015, which is a continuation of application No. PCT/CA2013/050627, application No. 14/683,450, which is a continuation-in-part of application No. 14/621,399, filed on Feb. 13, 2015, which is a continuation of application No. PCT/CA2013/050626.

(60) Provisional application No. 61/712,010, filed on Oct. 10, 2012, provisional application No. 61/712,236, filed on Oct. 10, 2012, provisional application No. 61/801,532, filed on Mar. 15, 2013, provisional application No. 61/683,156, filed on Aug. 14, 2012.

(51) Int. Cl.
| | | |
|---|---|---|
| *C25B 1/10* | (2006.01) | |
| *C25B 9/18* | (2006.01) | |
| *H01M 8/18* | (2006.01) | |
| *H01M 8/0656* | (2016.01) | |
| *H01M 8/0258* | (2016.01) | |
| *H01M 8/026* | (2016.01) | |
| *H01M 8/0265* | (2016.01) | |
| *H01M 8/2465* | (2016.01) | |
| *H01M 8/1018* | (2016.01) | |

(52) U.S. Cl.
CPC ....... *H01M 8/0258* (2013.01); *H01M 8/0265* (2013.01); *H01M 8/0656* (2013.01); *H01M 8/184* (2013.01); *H01M 8/186* (2013.01); *H01M 8/2465* (2013.01); *H01M 2008/1095* (2013.01); *Y02E 60/366* (2013.01); *Y02E 60/528* (2013.01)

(58) Field of Classification Search
CPC .... H01M 8/0656; H01M 8/10; H01M 8/1011; H01M 8/184; H01M 8/186; C25B 1/06; C25B 1/10; C25B 9/18; Y02E 60/366; Y02E 60/523; Y02E 60/528
See application file for complete search history.

(56) References Cited

U.S. PATENT DOCUMENTS

| | | | |
|---|---|---|---|
| 6,528,196 B1 | 3/2003 | Fujii et al. | |
| 6,551,736 B1 | 4/2003 | Gurau et al. | |
| 6,686,082 B2 | 2/2004 | Leger et al. | |
| 6,699,614 B2 | 3/2004 | Rock | |
| 6,756,149 B2 | 6/2004 | Knights et al. | |
| 6,921,598 B2 | 7/2005 | Yamamoto | |
| 7,067,213 B2 | 6/2006 | Boff et al. | |
| 7,138,200 B1 | 11/2006 | Iwase et al. | |
| 7,348,094 B2 | 3/2008 | Thompson et al. | |
| 7,459,227 B2 | 12/2008 | Rock et al. | |
| 7,524,575 B2 | 4/2009 | Bai et al. | |
| 7,601,452 B2 | 10/2009 | Goebel | |
| 7,615,308 B2 | 11/2009 | Frederiksen et al. | |
| 7,618,734 B2 | 11/2009 | Rapaport et al. | |
| 7,718,298 B2 | 5/2010 | Tighe et al. | |
| 7,781,087 B2 | 8/2010 | Rock et al. | |
| 7,838,139 B2 | 11/2010 | Turpin et al. | |
| 7,838,169 B2 | 11/2010 | Montie et al. | |
| 2002/0017463 A1* | 2/2002 | Merida-Donis | C02F 1/4691 204/551 |
| 2004/0023100 A1 | 2/2004 | Boff et al. | |
| 2004/0067405 A1 | 4/2004 | Turpin et al. | |
| 2004/0142225 A1 | 7/2004 | Turpin et al. | |
| 2005/0115825 A1 | 6/2005 | Frank et al. | |
| 2005/0221152 A1 | 10/2005 | Turpin et al. | |
| 2005/0271909 A1 | 12/2005 | Bai et al. | |
| 2006/0234107 A1 | 10/2006 | Leger et al. | |
| 2007/0009781 A1* | 1/2007 | Dong | H01M 8/0263 429/443 |
| 2007/0105000 A1 | 5/2007 | Chapman et al. | |
| 2009/0208803 A1 | 8/2009 | Farrington | |
| 2010/0190087 A1 | 7/2010 | Yoshida et al. | |
| 2011/0097648 A1 | 4/2011 | Blank et al. | |
| 2011/0159396 A1* | 6/2011 | Kleemann | H01M 8/026 429/457 |
| 2012/0308911 A1 | 12/2012 | Peled et al. | |

FOREIGN PATENT DOCUMENTS

| | | |
|---|---|---|
| EP | 1496558 A1 | 1/2005 |
| JP | SHO61-61256568 A | 11/1986 |
| JP | HEI03-3276569 A | 12/1991 |
| JP | HEI04-4370664 A | 12/1992 |
| JP | HEI06-6267564 A | 9/1994 |
| JP | HEI09-9050817 A | 2/1997 |
| JP | HEI11-11016590 A | 1/1999 |
| JP | HEI13-2001006717 A | 1/2001 |

OTHER PUBLICATIONS

Hwang et al., "Flow Field Design for a Polymer Electrolyte Unitized Reversible Fuel Cell", Honolulu PRiME, 2012, Abstract #1405.

Marangio et al., "Theoretical model and experimental analysis of a high pressure PEM water electrolyser for hydrogen production", International Journal of Hydrogen Energy, 2009, pp. 1143-1158, vol. 34.

Remick, "Reversible Fuel Cells Workshop Summary Report", U.S. Department of Energy, 2011, pp. 1-150.

* cited by examiner

REACTANT FLOW CHANNELS FOR ELECTROLYZER APPLICATIONS

CROSS-REFERENCE TO RELATED APPLICATIONS

This application is a continuation of and claims priority benefits from International Application No. PCT/CA2013/050769 filed Oct. 10, 2013 entitled "Reactant Flow Channels for Electrolyzer Applications" which claims priority benefits from U.S. Provisional Patent Application Ser. No. 61/712,010 filed Oct. 10, 2012 entitled "Fuel Cell Anode Flow Field"; U.S. Provisional Patent Application Ser. No. 61/712,236 filed Oct. 10, 2012 entitled "Fuel Cell Flow Fields Incorporating Improved Flow Channels for Enhanced Performance"; U.S. Provisional Patent Application Ser. No. 61/801,532 filed Mar. 15, 2013 entitled "Reactant Flow Fields for Electrolyzer Applications; International Application No. PCT/CA2013/050626 filed Aug. 14, 2013 entitled "Fuel Cell Components, Stacks and Modular Fuel Cell Systems"; and international Application No. PCT/CA2013/050627 entitled "Fuel Cell Flow Channels and Flow Fields" filed Aug. 14, 2013. This application also claims priority benefits from the '010, '236, '532, '626, and '627 applications.

This application is also a continuation-in-part of and claims priority benefits from U.S. patent application Ser. No. 14/622,830 filed Feb. 14, 2015 entitled "Fuel Cell Flow Channels and Flow Fields" which is a continuation of the '627 application, which is related to and claim priority benefits from the U.S. Provisional Patent Application Ser. No. 61/683,156 filed Aug. 14, 2012, entitled "Fuel Cell Components, Stacks and Systems Based on a Cylindrical Fuel Cell Stack Architecture", the '010 application, and the '236 application. This application also claims priority benefits from the '156, '236, '010, and '627 applications.

This application is also a continuation-in-part of and claims priority benefits from U.S. patent application Ser. No. 14/621,399 filed Feb. 13, 2015 entitled "Fuel Cell Components, Stacks and Modular Fuel Cell Systems" which is a continuation of the '626 international application, which is related to and claim priority benefits the '156 provisional application and the '532 provisional application. This application also claims priority benefits from the '156, '532, and '626 applications.

Each of the '156, '010, '236, '532, '769, '830, '399, '626, and '627 applications are hereby incorporated by reference herein in their entirety.

FIELD OF THE INVENTION

The present invention relates generally to electrolyzers, and in particular to fluid flow channels and flow fields for an electrolyzer, and electrolyzers and electrolyzer stacks incorporating such fluid flow channels and flow fields.

BACKGROUND OF THE INVENTION

Although many electrolyzers are based on an alkaline (KOH) electrolyte, another option is to use a proton exchange membrane (PEM) as the electrolyte. In PEM electrolysis, water is supplied to the anode and is split into oxygen, protons and electrons by applying a DC voltage. Protons pass through the polymer electrolyte membrane and combine with electrons at the cathode to form hydrogen; thus oxygen is produced at the anode, and hydrogen is produced at the cathode as illustrated in a schematic diagram in FIG. 1. It is important that the hydrogen and oxygen, which evolve at the surfaces of the respective electrodes, are kept separate and do not mix.

The electrolysis process is essentially the reverse of the process in a PEM fuel cell. A PEM electrolyzer cell can be very similar in structure to a PEM fuel cell, with a polymer membrane sandwiched between a pair of porous electrodes and flow field plates. FIG. 2A shows a simplified diagram of an electrolyzer unit cell, and FIG. 2B shows a simplified diagram of a fuel cell unit cell. The materials used in a PEM electrolyzer are generally different because the carbon materials commonly used as catalyst supports, gas diffusion layers and flow field plates in fuel cells cannot be used on the oxygen side of a PEM electrolyzer due to corrosion. Metallic components (for example, tantalum, niobium, titanium, or stainless steel plated with such metals) are often used instead for porous layers and flow field plates in PEM electrolyzers. The catalyst is typically platinum or a platinum alloy, and is designed to operate in the presence of liquid water.

Multiple electrolyzer cells can be connected either in series or in parallel (to get the desired output at a reasonable stack voltage) to form an electrolyzer stack. In addition to one or more electrolyzer stacks comprising end plates, bus plates and manifolds, and other system components, an electrolyzer system will typically comprise a power supply, a voltage regulator, water purification and supply equipment including a circulation pump, water-gas separators for hydrogen and optionally oxygen, a thermal management system, controls and instrumentation, and equipment for storage and subsequent dispensing of the product gas(es).

A fuel cell system can be combined with an electrolyzer system, so that a renewable energy source can be used to power an electrolyzer to generate hydrogen and oxygen which can be stored, and then subsequently used as reactants for a fuel cell to produce electric power. Such a combined electrolyzer/fuel cell system is illustrated in FIG. 3A. Efforts are presently underway to develop a unitized stack that could serve as both fuel cell and electrolyzer. Such a device has been referred to as a "reversible fuel cell" or a "unitized regenerative fuel cell" (URFC). A PEM URFC stack delivers power when operated as a fuel cell using hydrogen as the fuel, and either air or oxygen as the oxidant, and generates hydrogen and oxygen when operated as an electrolysis cell. A URFC system is illustrated in FIG. 3B.

Design of the individual cells and cell components for a URFC should address the distinctly different operating conditions occurring during each mode of operation. For example, the oxygen/air electrode potential is quite different in one mode versus the other. In the exothermic fuel cell mode, humidified, gaseous reactants are generally required along with rapid removal of the heat and water produced, while in the electrolysis mode, liquid water is required as the reactant at one electrode, with rapid removal of the product oxygen at the anode and hydrogen at the cathode. The balance of plant supporting the PEM URFC is designed to handle product water in the fuel cell mode, maintain the thermal balance within the fuel cell (cooling plates are typically used to remove excess heat when the fuel cell is producing power), deliver clean reactants, and produce regulated power. Balance of plant issues for URFC include design of the thermal management system (because operation in the electrolysis mode is slightly endothermic), and collection of the product hydrogen and optionally oxygen.

In a PEM electrolyzer the issues associated with liquid reactant supply and gaseous product removal are somewhat different to those in a PEM fuel cell, where hydrogen and a gaseous oxidant (for example, air) are typically supplied to the anode and cathode respectively, and water is produced at the cathode. In PEM fuel cells the gaseous reactants are generally supplied to the electrodes via channels formed in the flow field plates. A typical reactant fluid flow field plate has at least one channel through which a reactant stream flows. The fluid flow field is typically integrated with the separator plate by locating a plurality of open-faced channels on one or both faces of the separator plate. The open-faced channels face an electrode, where the reactants are electrochemically converted. In a single cell arrangement, separator plates are provided on each of the anode and cathode sides. In a stack, bipolar plates are generally used between adjacent cells; these bipolar plates generally have flow fields on both sides of the plate. The plates act as current collectors and provide structural support for the electrodes.

The flow field used at both the anode and the cathode can have an important influence on fuel cell performance, and much work has been done on the optimization of flow field designs for PEM fuel cells. Conventionally the reactant flow channels in fuel cell flow fields have a constant cross-section along their length. However, U.S. Pat. No. 6,686,082 (which is hereby incorporated by reference herein in its entirety) describes fuel cell embodiments in which the fuel flow channels have a cross-sectional area that decreases linearly in the flow direction. For fuel cells operating on air as the oxidant, as the air flows along the cathode flow channel(s), the oxygen content in the air stream tends to be depleted and the air pressure tends to drop, resulting in reduced performance in the fuel cell. U.S. Pat. No. 7,838,169 (which is hereby incorporated by reference herein in its entirety) describes improved cathode flow field channels that can be used to achieve substantially constant oxygen availability along the channel.

Less work appears to have been done on studying the effect of flow field design on the performance of PEM electrolyzers, although it has been reported that electrolyzer operation is generally less sensitive to changes in flow field design than fuel cell operation.

It has been reported (Hwang, C. M., et al. *Abst.* #1405 *Honolulu PRiME* 2012, *The Electrochemical Society*) that in a PEM URFC, a preferred flow field design for operation in the fuel cell mode does not work so well in electrolysis mode, particularly at higher current densities (where the rate of hydrogen and oxygen production is greater). The study notes that serpentine flow fields are popular for PEM fuel cells because gas flow in a serpentine flow field has a higher velocity and greater shear force providing efficient removal of product water in the channels. Contrary to this, in electrolysis mode the longer serpentine flow field channels can be disadvantageous because product gases (hydrogen and oxygen) can tend to accumulate in the channels and hinder the supply of water to the electrode, and limit the rate of electrochemical oxidation of reactant water.

Although flow fields that are preferred for fuel cells are not necessarily the same as those that are preferred for electrolyzers, the Applicants have discovered that flow fields where the channel cross-sectional area varies along the length of the channel, particularly at the oxygen electrode, can offer advantages in electrolyzers, as well as in URFCs that can operate in both fuel cell and electrolyzer modes.

SUMMARY OF THE INVENTION

An electrolyzer assembly for generating hydrogen and oxygen from water comprises one or more unit cells. The unit cells each comprise a membrane electrode assembly comprising a proton exchange membrane interposed between an anode and a cathode; a cathode flow field plate adjacent to the cathode; and an anode flow field plate adjacent to the anode. The cathode flow field plate optionally has at least one cathode channel formed therein, for carrying away hydrogen produced at the cathode during operation of the electrolyzer assembly. The anode flow field plate has at least one anode channel formed therein for directing water in contact with the anode during operation of the electrolyzer assembly. The at least one anode channel has a cross-sectional area that varies along at least a portion of the length of the anode channel. For example, anode channel cross-sectional area can be varied by a variation in at least one of the channel width, channel depth and channel shape. In some embodiments, the channel cross-sectional area varies (such as by variations in dimensions of width, depth or shape) along substantially the entire length of the anode channel.

In some embodiments, the depth of the anode channel is substantially constant, and the width of the anode channel decreases along at least a portion of the channel length in a direction of reactant (water) flow along the channel. In some embodiments, the depth of the anode channel is substantially constant, and the width of the anode channel decreases along at least a portion of the channel length in a direction of reactant flow according to a natural exponential function. In some embodiments, the depth of the anode channel is substantially constant, and the width of the anode channel at a selected lengthwise position along the channel portion is proportional to a natural exponential function of the selected lengthwise position. In some embodiments, the width of the anode channel is substantially constant for a portion of the channel length and the channel width varies along another portion of the channel length.

In some embodiments, the depth of the anode channel is substantially constant, and the width of the anode channel varies as a function of distance along the portion of the channel length such that:

$$W(x) = \frac{ST_{H_2O} k_{H_2O} i_t}{Dv} e^{\ln\left(\frac{ST_{H_2O}-1}{ST_{H_2O}}\right)\frac{x}{L}}$$

where W(x) is the anode channel width at lengthwise position x; x is a selected position along the channel length; D is the channel depth; v constant flow velocity; $ST_{H_2O}$ is water stoichiometry; $k_{H_2O}$ is flow rate coefficient for water; $i_d$ is the total channel current; and L is the channel length.

In other embodiments, the width of the anode channel is substantially constant, and the depth of the anode channel decreases along at least a portion of the channel length in a direction of reactant flow along the channel. The channel depth can, for example, decrease substantially linearly along at least a portion of the channel length in a direction of reactant flow. The channel depth can, for example, vary as a function of distance along the portion of the channel length such that:

$$D(x) = \frac{ST_{H_2O} k_{H_2O} i_d L}{v}\left(1 - \frac{x}{ST_{H_2O} L}\right)$$

where D(x) is the anode channel depth at lengthwise position x; x is a selected position along the channel length;

$ST_{H_2O}$ is water stoichiometry; $k_{H_2O}$ is flow rate coefficient for water; $i_d$ is current density; and L is the channel length.

In the above-described embodiments, the electrolyzer assembly can comprise a plurality of the unit cells arranged in a stack.

In some embodiments, the electrolyzer assembly is configured to also operate as a fuel cell to generate electric power and water when oxygen and hydrogen are supplied to the anodes and cathodes.

A unitized regenerative fuel cell assembly is configured to operate both as an electrolyzer to produce hydrogen and oxygen from water, and as a fuel cell to produce electric power from hydrogen and oxygen. The unitized regenerative fuel cell comprises one or more unit cells. The unit cells each comprise a membrane electrode assembly that comprises a proton exchange membrane interposed between a first electrode and a second electrode; a first flow field plate adjacent to the first electrode, the flow field plate comprising at least one oxygen-side channel for directing a first fluid stream in contact with the adjacent first electrode. The at least one oxygen-side channel has a length and a cross-sectional area that varies along at least a portion of the channel length (for example, as for the anode channel in the electrolyzer assembly embodiments described above). Each unit cell optionally further comprises a second flow field plate adjacent to the second electrode, the flow field plate comprising at least one hydrogen-side channel. The hydrogen-side channel can, for example, be used for directing a second fluid stream in contact with the adjacent second electrode (for example, delivering hydrogen to the anode during fuel cell operation) and for carrying away hydrogen produced at the second electrode (the cathode, during electrolyzer operation).

The unitized regenerative fuel cell assembly can comprise a plurality of the unit cells arranged in a stack.

For operation of the unitized regenerative fuel cell assembly as an electrolyzer, the at least one unit cell is connected to a source of electrical power and the at least one oxygen-side channel is fluidly connected to a water supply for flowing reactant water through the at least one oxygen-side channel. For operation of the unitized regenerative fuel cell assembly as a fuel cell, the at least one oxygen-side channel is fluidly connected to receive an oxygen-containing reactant stream, the at least one hydrogen-side channel is fluidly connected to receive a hydrogen-containing reactant stream, and the at least one unit cell is connected to an electrical load, to provide electric current between the first and second electrodes anodes and cathodes).

In some embodiments the depth of the at least one oxygen-side channel is substantially constant, and the width of the at least one oxygen-side channel decreases along at least a portion of the channel length (in a direction of water reactant flow during electrolyzer operation, and in a direction of oxygen-containing reactant stream flow during fuel cell operation). The variation in width can be, for example, as described above for the various embodiments of an anode channel of an electrolyzer assembly.

Embodiments of the above-described electrolyzer assembly, or unitized regenerative fuel cell assembly, can further comprise one or more of the following:

a water supply fluidly coupled, via a valve, to deliver water to the oxygen-side channels;

a power supply switchably connected to deliver electrical power to the electrolyzer assembly or unitized regenerative fuel cell assembly;

a hydrogen containment vessel fluidly coupled, via a valve, to the cathode flow field plates to collect hydrogen generated by the electrolyzer assembly or unitized regenerative fuel cell assembly;

an oxygen containment vessel fluidly coupled, via a valve, to the cathode flow field plates to collect oxygen generated by the electrolyzer assembly or unitized regenerative fuel cell assembly.

DETAILED DESCRIPTION OF PREFERRED EMBODIMENT(S)

Figure 1:
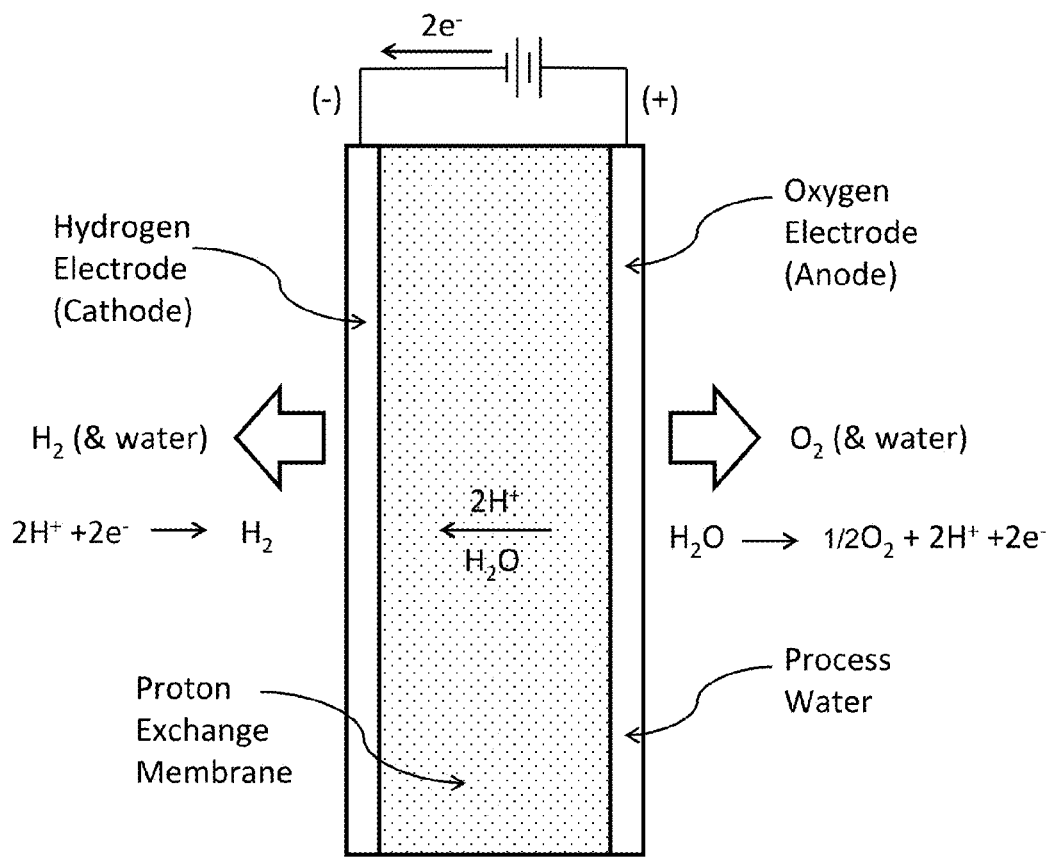
FIG. 1 (Prior Art) is a schematic diagram of an electrolyzer, showing the reactions occurring in a water electrolysis process.
Figure 2A:
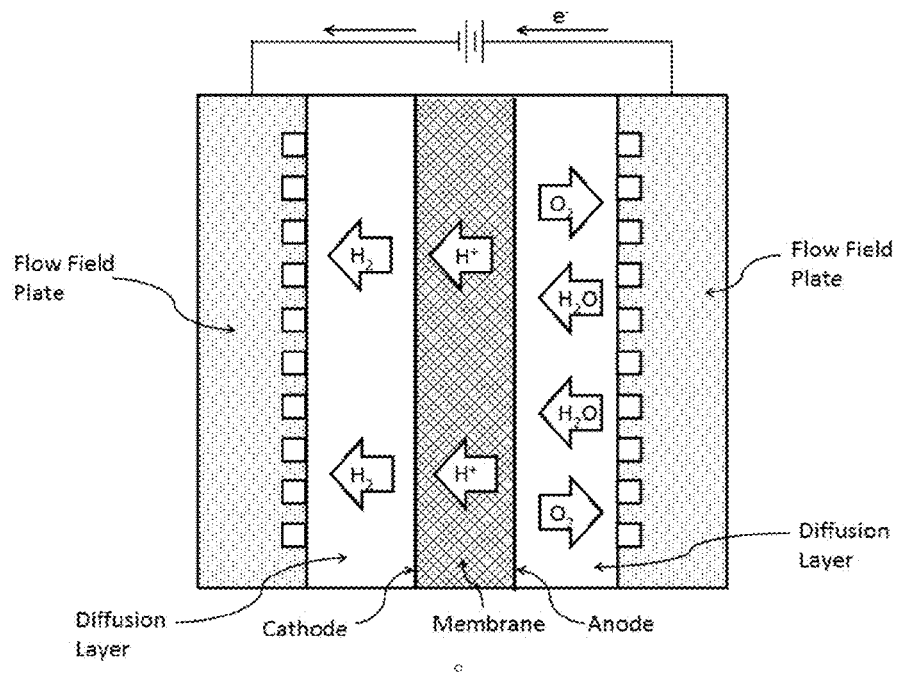
FIG. 2A (Prior Art) is a simplified diagram of an electrolyzer unit cell showing a membrane electrode assembly sandwiched between a pair of flow field plates.
Figure 2B:
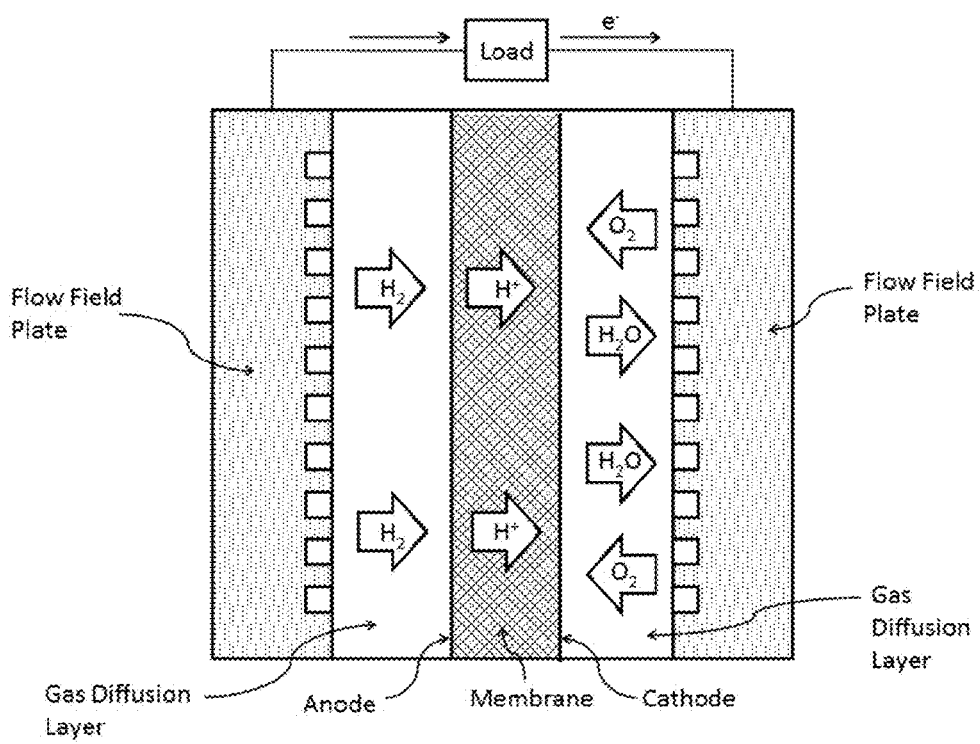
FIG. 2B (Prior Art) is a simplified diagram of a fuel cell unit cell, showing a membrane electrode assembly sandwiched between a pair of flow field plates.
Figure 3A:
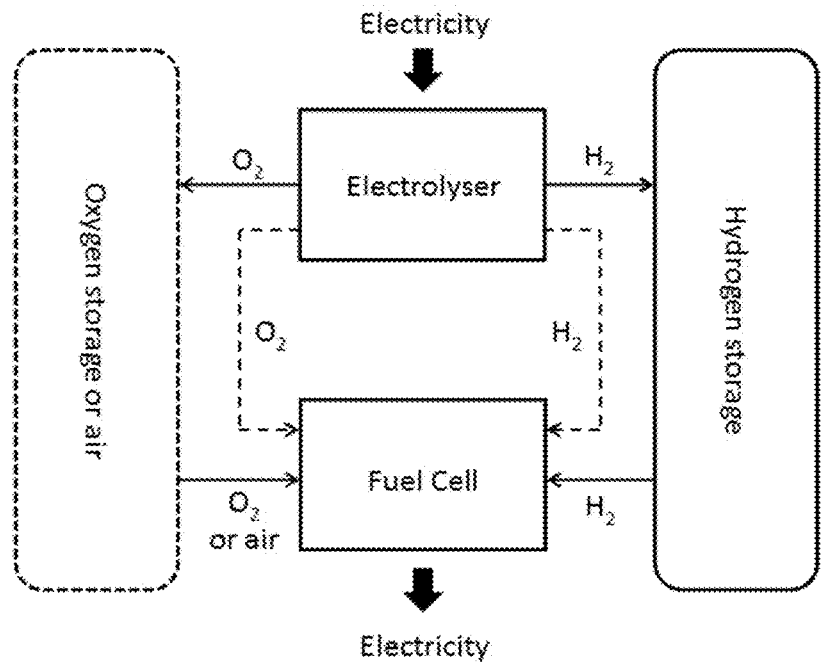
FIG. 3A (Prior Art) is a simplified diagram of a combined electrolyzer/fuel cell system with separate stacks for the fuel cell and the electrolyzer.
Figure 3B:
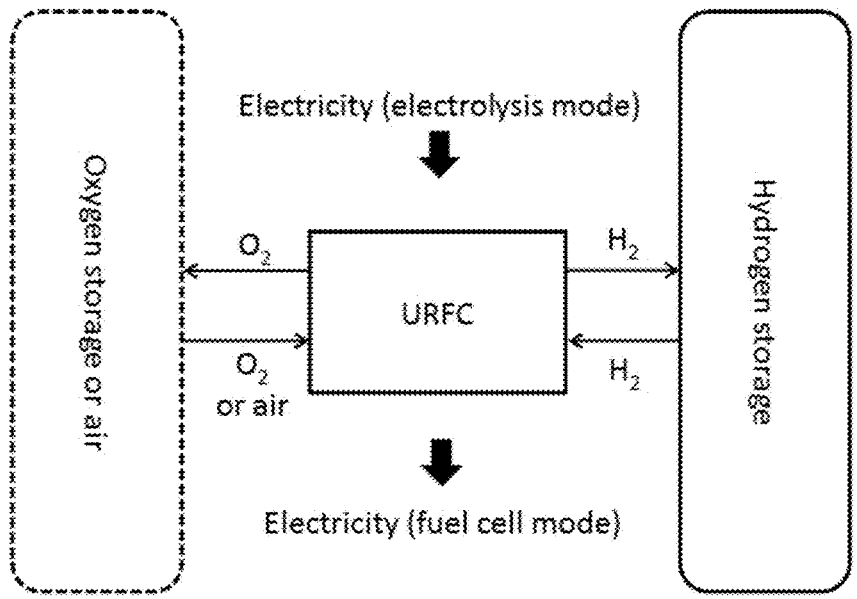
FIG. 3B (Prior Art) is a simplified diagram of a unitized regenerative fuel cell (URFC) system.

An electrolyzer assembly includes a flow field plate comprising at least one channel, wherein the cross-sectional area of the channel varies along at least a portion of the channel length. In preferred embodiments the channel width decreases in the direction of reactant flow along at least a portion of the length of the channel according to a natural exponential function. The use of this type of improved flow field channel, particularly at the oxygen electrode (electrolyzer anode), can improve performance and/or efficiency of operation of an electrolyzer assembly.

Without being bound by theory, the following discussion, equations, and numerical modeling can be helpful in explaining at least some of the basis for the benefits that can be achieved using embodiments described herein.

One approach is to design an electrolyzer anode flow channel for substantially constant water velocity which maintains a substantially constant availability of water across the active area. It is postulated that:

Water availability is related to cell reaction performance.
Uniform water availability promotes uniform current density.

In an electrolyzer, water is directed or pumped through a flow field in order to distribute the water across the active area of the anode. However, as water moves through the flow field it is consumed. Furthermore, each mole of water that is consumed is replaced by half a mole of oxygen. Several issues arise that can detrimentally affect the efficiency and/or performance of the electrolyzer. For example, as the water is consumed the velocity of water flowing down the channel will tend to decrease. The result is that the amount of reactant being delivered per unit time varies across the active area of the cell. Secondly, the product oxygen that is evolved at the anode tends to form bubbles in the flow field. This can impede access of reactant water to the anode catalyst sites. Both of these effects can lead to non-uniformity in the current distribution. Conventional electrolyzers do not adequately address these issues.

It is believed that maintaining a constant velocity of water in the electrolyzer anode flow field channel(s) can address either or both of the above issues and will promote a more uniform current density and, as a consequence, improve electrolyzer performance.

To derive the equations and formulae set forth below, various assumptions including the following were made:

Uniform current density—an objective is to design the electrolyzer anode flow channel for substantially uniform current density.

Incompressible flow—the water in the system is assumed to remain at a constant volume and contain a negligible amount of dissolved oxygen, and the gaseous oxygen produced is equally incompressible.

Substantially evenly distributed water concentration, velocity, and mass flow across flow section the model alleviates complexity by neglecting concentration gradients that can occur in the cross-section of the channel.

Above rib activity is not considered—the anode reaction is considered to be local to the flow channel only.

Water cross-over is not considered—water flow across the electrolyzer membrane due to concentration gradients, electro-osmotic drag, and/or back-diffusion of water is not considered as a contributor to anode water stoichiometry.

Steady state system—the reaction and flows are assumed to be steady state, or unchanging.

The variables used below are defined as follows:
$A(x)$ Cross-sectional flow area [m$^2$]
$D(x)$ Depth of channel at position x [m]
$F$ Faraday's Constant [A-s/mol]
$i_{acc}(x) i_{acc}(x)$ Accumulated current up to position x [A]
$i_d$ Current density [A/m$^2$]
$i_d$ Total channel current [A]
$k_{H_2O}$ Flow rate coefficient for water [m$^3$/s/A]
$k_{O_2}$ Flow rate coefficient for oxygen [m$^3$/s/A]
$L$ Length of channel [m]
$M(H_2O)$ Molecular mass of water [kg/mol]
$n_e$ Number of moles of electrons per mole of water oxidized
$n_{H_2O}$ Assumed to be 1
$n_{O_2}$ Number of moles of oxygen produced per mole of water oxidized $Q_{consumed}(x)$ Volumetric flow rate of water consumed at position x [m³/s]
$Q_{H_2O}(x)$ Volumetric flow rate of water at position x [m³/s]
$Q_{in}$ Inlet volumetric flow rate of water at position x [m³/x]
$Q_{O_2}(x)$ Volumetric flow rate of oxygen at position x [m³/s]
$\rho_{H_2O}$ Density of water [kg/m³]
$ST_{H_2O}$ Design stoichiometric ratio (stoichiometry) of water
$ST'_{H_2O}$ Operational stoichiometric ratio (stoichiometry) of water
v Constant flow velocity [m/s]
v(x) Flow velocity at position x [m/s]
$V_m$ Molar volume of ideal gas at standard conditions [m³/mol]
W(x) Width of channel at position x [m]
x Position along channel length [m]

Constant Velocity Equation

In order to maintain a constant velocity of water in the electrolyzer anode flow channel(s) (ignoring the effect of oxygen production), the channel cross-sectional area varies with the decreasing volumetric flow rate of water according to the following equation:

$$v(x) = \frac{Q_{H_2O}(x)}{A(x)} = const. \tag{1}$$

When the volumetric flow rate of water, $Q_{H_2O}(x)$, is written in terms of the inlet flow rate of water $Q_{in}$ and the flow rate of water consumed at a channel position x, then the constant velocity, v, becomes:

$$v = \frac{Q_{in} - Q_{consumed}(x)}{A(x)} \tag{2}$$

Knowing that $Q_{in}$ is the product of the stoichiometry of water supplied, $ST_{H_2O}$, the water flow rate coefficient, $k_{H_2O}$, and the total current load on the plate, $i_t$, and that the consumed volumetric flow rate of water is the product of the water flow rate coefficient and the current accumulated up to position x along the channel, the velocity can be rewritten as:

$$v = \frac{ST_{H_2O} k_{H_2O} i_t - k_{H_2O} i_{acc}(x)}{A(x)} \tag{3}$$

where:

$$i_{acc}(x) = i_d \int_0^x W(x)dx \tag{4}$$

with $i_d$ being the nominal current density on the plate. The total current can also be rewritten as a product of the current density and
the total area, which is the width function integrated over the length of the channel.

$$i_t = i_d \int_0^L W(x)dx \tag{5}$$

Substituting (4) and (5) into equation (3) yields the following expression for velocity:

$$v = \frac{ST_{H_2O} k_{H_2O} i_d \int_0^L W(x)dx - k_{H_2O} i_d \int_0^x W(x)dx}{A(x)} \tag{6}$$

The water flow rate coefficient can be calculated as follows:

$$k_{H_2O} = \frac{n_{H_2O}}{n_e F} \times \frac{M(H_2O)}{\rho_{H_2O}} \tag{7}$$

where the quantities of $n_{H_2O}$ and $n_e$ are constants resulting from the chemical reactions for the electrolysis of water, and $\rho_{H_2O}$ and $M(H_2O)$ are the density and molecular mass of water, respectively.

Channel Profile for Uniform Water Availability

Now that the velocity equation has been developed, an electrolyzer anode channel profile can be designed on this basis, to achieve substantially constant or uniform reactant water availability. If the channel width is held constant, and the integrals are appropriately evaluated, then equation (6) can be rearranged to solve for the channel depth, D(x):

$$D(x) = \frac{ST_{H_2O} k_{H_2O} i_d WL - k_{H_2O} i_d Wx}{Wv} \tag{8}$$

This can further be reduced to:

$$D(x) = \frac{ST_{H_2O} k_{H_2O} i_d L}{v}\left(1 - \frac{x}{ST_{H_2O} L}\right) \tag{9}$$

The result is that the depth profile is a linear function of x.

Figure 4A:
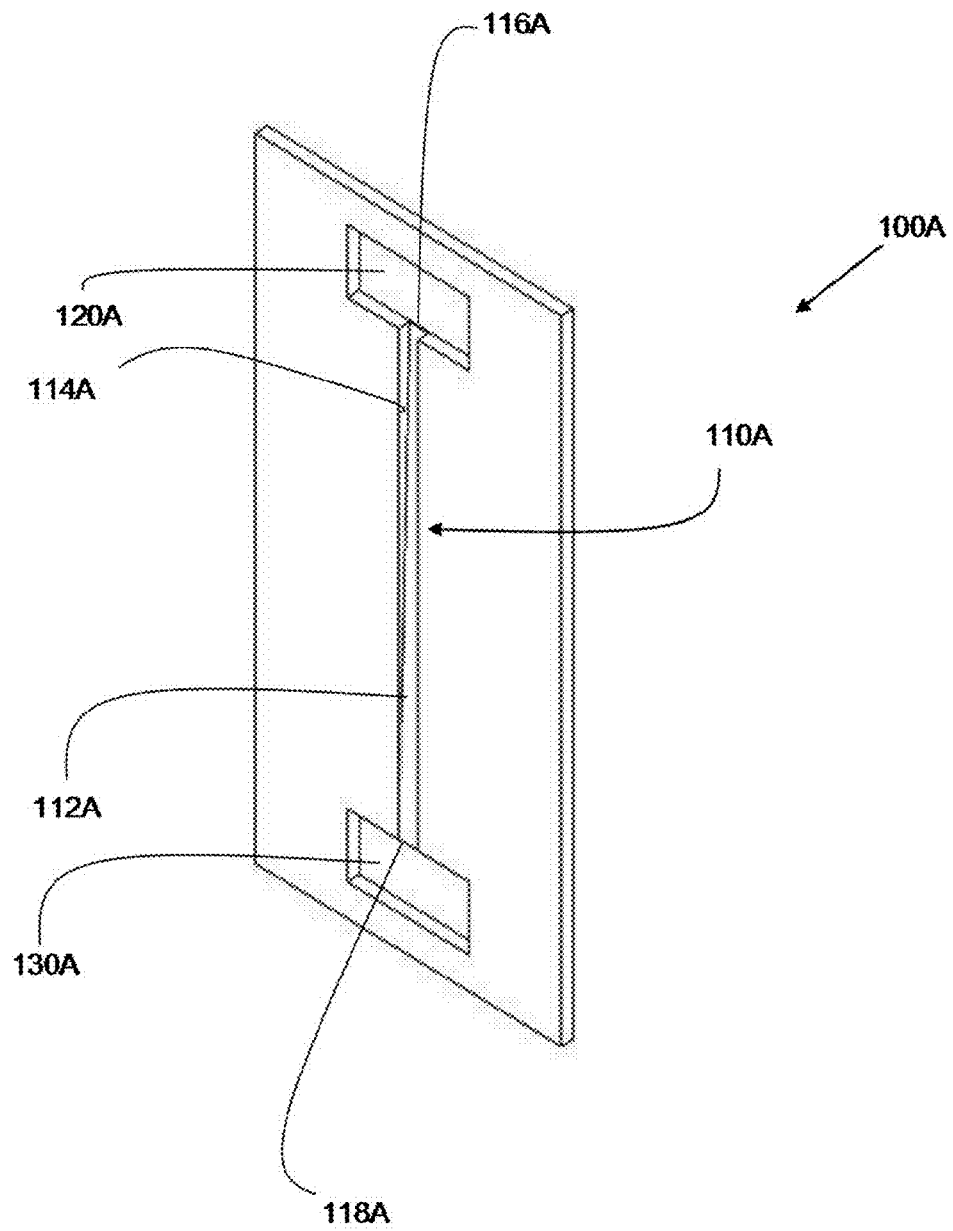
FIG. 4A is a simplified representation of an electrolyzer flow field plate comprising a flow channel that decreases in depth, with constant width, along its length.

FIG. 4A is a simplified representation of an electrolyzer anode flow field plate 100A comprising a flow channel 110A that decreases in depth, with constant width, along its length. A channel profile can be defined by solving for D(x) in equation (9) at each position x along the length of the channel, given a specified operating reactant water stoichiometry and channel length L, and assuming a constant channel width. Referring to FIG. 4A, the resulting channel 110A extends between water supply manifold opening 120A and discharge manifold opening 130A, and has a linearly decreasing depth floor 112A from inlet 116A to outlet 118A, with straight (parallel) side walls 114A.

Given the desire to reduce the thickness of the electrolyzer plates, it is generally desirable to keep the depth of the channel shallow. Therefore, instead of varying the depth of the channel, which would require a sufficiently thick plate to accommodate the deepest part of the channel, it can be preferred to keep the channel depth constant (D) and to vary the width of the channel to achieve substantially uniform water availability along the length of the channel.

If the channel depth is held constant, then the channel width can be expressed as follows:

$$W(x) = \frac{ST_{H_2O} k_{H_2O} i_d \int_0^L W(x)dx - k_{H_2O} i_d \int_0^x W(x)dx}{v \times D} \tag{10}$$

The easiest means of solving this equation is via the guess-and-solve method. One solution to guess is a simple exponential of the form:

$$W(x) = Ae^{B\frac{x}{L}} \tag{10}$$

Two boundary conditions are required to find the particular solution. The first can be found by substituting x=0 into equations Error! Reference source not found.) and (10):

$$W(0) = \frac{ST_{H_2O}k_{H_2O}i_t}{D \times v} = A \qquad (11)$$

The second can be identified by substituting x=L into equations Error! Reference source not found.) and (10):

$$W(L) = \frac{(ST_{H_2O} - 1)k_{H_2O}i_t}{D \times v} = \frac{ST_{H_2O}k_{H_2O}i_t}{Dv}e^B \qquad (13)$$

Solving for B, the result is:

$$B = \ln\left(\frac{ST_{H_2O} - 1}{ST_{H_2O}}\right) \qquad (14)$$

Substituting equations (11) and Error! Reference source not found. into equation (10) gives:

$$W(x) = \frac{ST_{H_2O}k_{H_2O}i_t}{Dv} e^{\ln\left(\frac{ST_{H_2O}-1}{ST_{H_2O}}\right)\frac{x}{L}} \qquad (15)$$

The resulting channel profile has an exponentially decreasing width.

Figure 4B:
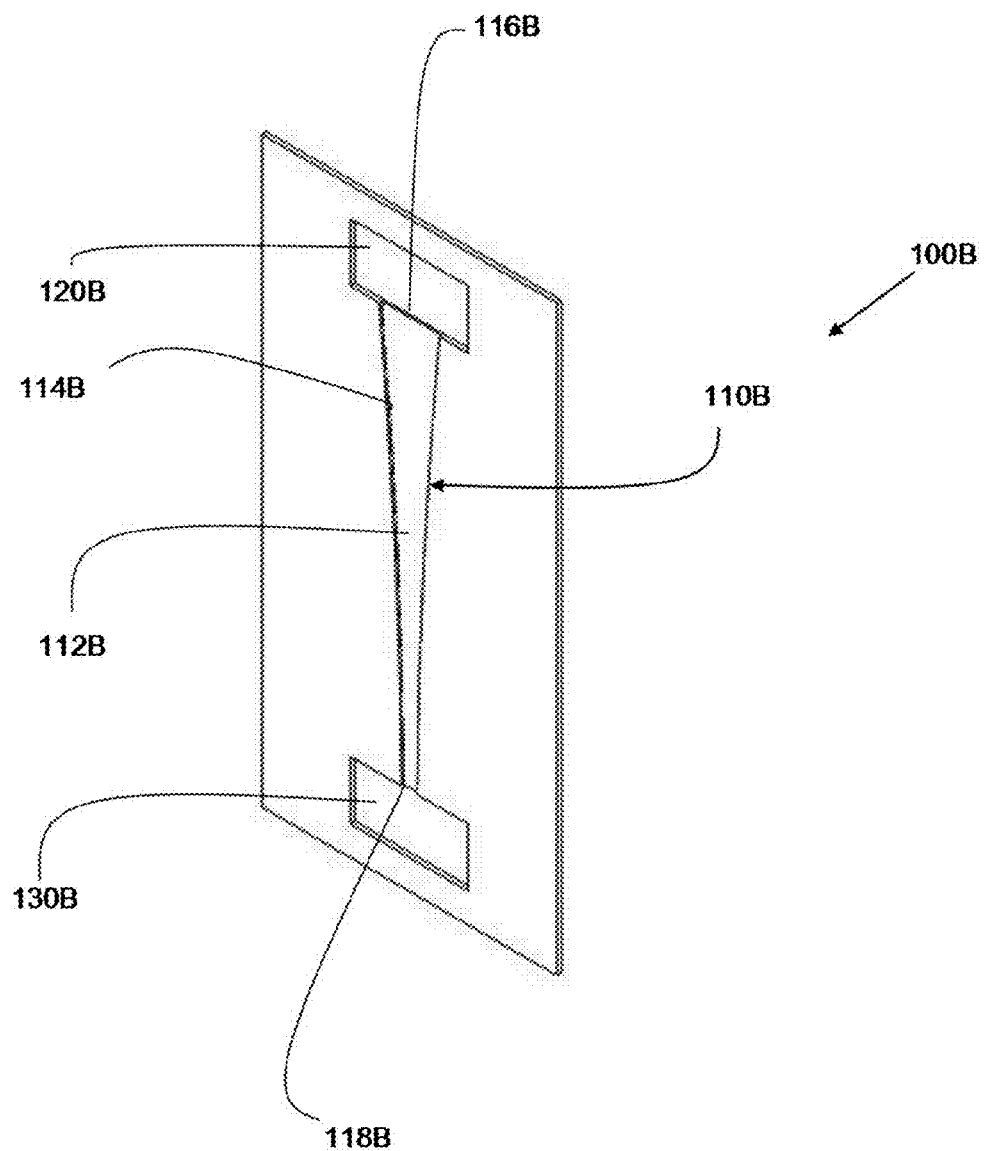
FIG. 4B is a simplified representation of an electrolyzer flow field plate comprising a flow channel that decreases exponentially in width, with constant depth, along its length.

FIG. 4B is a simplified representation of an electrolyzer anode flow field plate 100B comprising a flow channel 110B that decreases in width along its length according to an exponential function. A channel profile can be defined by solving for W(x) in equation (15) at each position x along the length of the channel, given a specified design reactant water stoichiometry, channel length L, total current draw $i_d$ (or current density and active area) and assuming a flat channel floor (constant depth, D). Referring to FIG. 4B, the resulting channel 110B extends between water supply manifold opening 120B and discharge manifold opening 130B, and has a constant depth floor 112B with convexly curved side walls 114B that converge inwards from inlet to outlet. The walls 114B converge inwards towards an outlet end 118B with an inlet 116B having the largest width and the channel profile delineating at a diminishing rate. That is, the channel width decreases exponentially along the length of the channel from the inlet, to the outlet according to the equation (15). It would be possible for one of the side walls to be straight and the other to be convexly curved.

Generally, from a practical standpoint, it is preferable to vary the channel width. Flow field plates with channels of varying width are generally easier to manufacture than plates with channels of varying depth, or channels with a cross-sectional shape that varies along the channel length.

Figure 5:
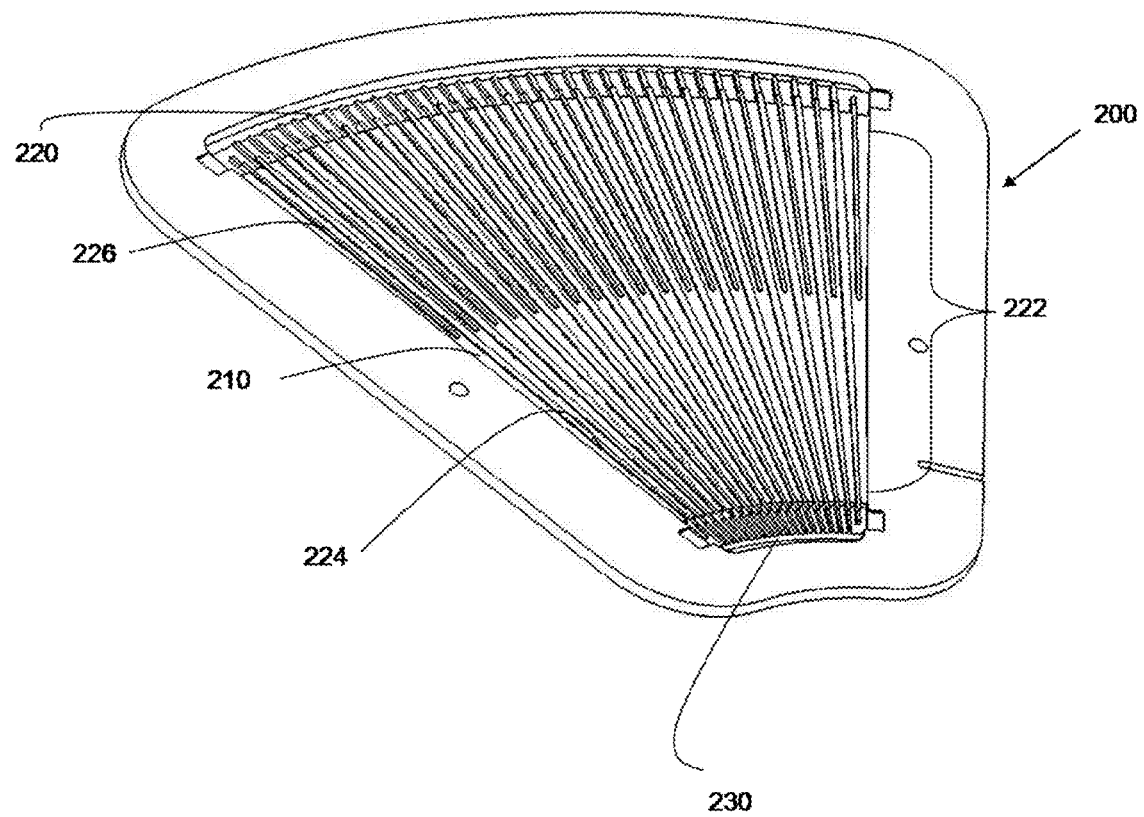
FIG. 5 shows a trapezoidal electrolyzer flow field plate comprising multiple flow channels that decrease exponentially in width along their length.

Referring to FIG. 5, multiple channels 210 having the channel profile shown in FIG. 4B can be applied to an electrolyzer plate 200, to form an electrolyzer anode flow field 222 extending between a water supply manifold opening 220 and discharge manifold opening 230. The flow field 222 is arrayed in a generally trapezoidal geometry to enable separating ribs 224 to have a relatively even width along their length.

The separator plate 20 includes partial ribs 26 located at the inlet of each channel 10. The partial ribs 26 serve to reduce the distance between channel side walls 14, and serves as a bridging structure for the adjacent membrane electrode assembly (not shown).

Embodiments in which the fluid flow channel width varies in an exponential manner in can in some circumstances be beneficial in enhancing the localized reactant and/or product flow velocity during electrolyzer operation thereby improving performance. Also, the pressure drop along the channel can be reduced (relative to a channel of constant cross-sectional area). This can lead to reduced parasitic loads improved overall system efficiency. Furthermore, the variation in channel width can be designed to adjust or control the localized residency time of the gaseous products in the channels, in some circumstances allowing some or all of the following:

(a) improved diffusivity of reactants for a more localized homogeneous concentration, increased access to the catalyst;

(b) more efficient removal of products from the cell;

(c) overall pressure drop and flow friction.

Improved efficiency can be realized through a reduction in electrolyzer power input, or and overall improvement in specific output of hydrogen, or a reduction in stressful environmental conditions components are subjected to, potentially leading to improved longevity.

Numerical Model

So far, the solution has focused on compensating for the consumption of water with a change in channel cross-sectional area and has ignored the effects of oxygen production. This can be expressed as:

$$Q_{O_2}(x) = k_{O_2} i_d \int_0^x W(x)dx \qquad (16)$$

And $k_{O_2}$ can be written a way that is similar to $k_{H_2O}$:

$$k_{O_2} = \frac{n_{O_2}}{n_e F} V_m \qquad (17)$$

Now, it is postulated that an increase in velocity will improve or facilitate the removal of gaseous oxygen produced at the electrolyzer anode. Since $k_{O_2}$ is approximately 600 times larger than $k_{H_2O}$, an increase in velocity will occur even if the channel width and depth are held constant, assuming incompressible flows. However, a channel mimicking the profile outlined in equation Error! Reference source not found. will greatly amplify this increase in velocity.

An electrolyzer can be thermally controlled during operation in various ways. Sometimes the reactant water supplied to the anode is also used to maintain the temperature of the electrolyzer within a desired range. In this situation, it is not uncommon for the water stoichiometry to exceed 1000 ($ST_{H_2O}$>1000). Another mode of operation is when there are separate water supplies for the reactant and coolant water. In this case, the reactant water can be supplied at significantly lower stoichiometry. One advantage of this approach is that the parasitic load used to pump water through the anode flow channel(s) is greatly reduced. On the other hand, this potentially reduces the velocity of fluid flow through the anode flow channel(s).

To exemplify these cases, two channel geometries were modeled: One designed to compensate for a constitution of water, and another with no such compensation. This first channel follows the profile described in equation Error! Reference source not found. and the second channel is a conventional channel that has a constant profile along its length (for example, constant width and constant depth). Channel dimensions used in the model are summarized in Table 1.

TABLE 1

|  | Compensated channel | Constant profile channel |
| --- | --- | --- |
| Inlet width (mm) | 2.5 | 1.5 |
| Channel active area (cm$^2$) | 1.5 | 1.5 |
| Channel depth (mm) | 1.0 | 1.0 |
| Channel length (rum) | 100 | 60 |

Some typical operating parameters were used to model these two scenarios. These are summarized in Table 2.

TABLE 2

|  | Reactant water is used for cooling | Different reactant and coolant water streams |
| --- | --- | --- |
| $ST_{H_2O}$ | 1000 | 1.5 |
| $i_d$ (A/cm$^2$) | 0.5 | 0.5 |

Figure 6A:
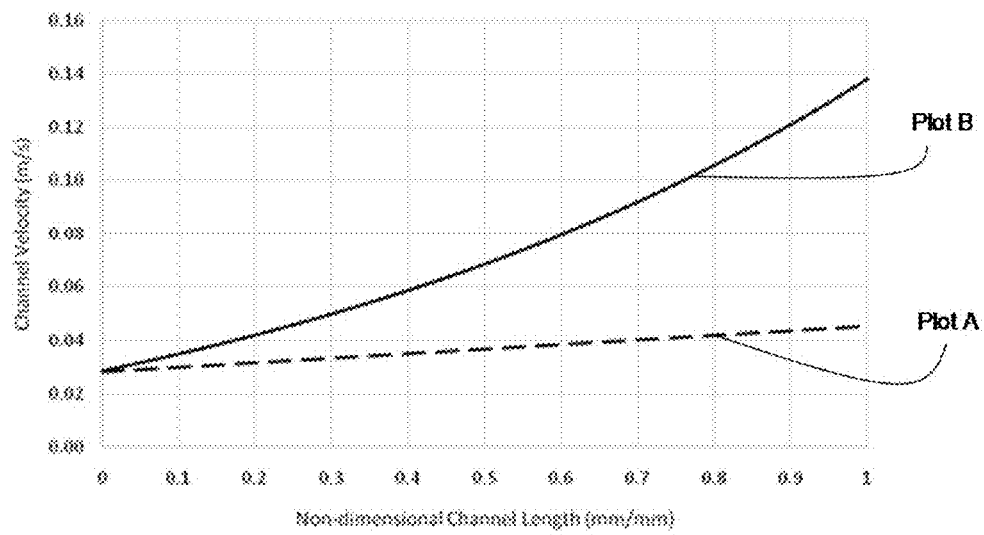
FIG. 6A is a graph showing fluid flow velocity along electrolyzer anode flow channels with two different profiles, modeled for an electrolyzer operating at a higher reactant water stoichiometry than in FIG. 6B.
Figure 6B:
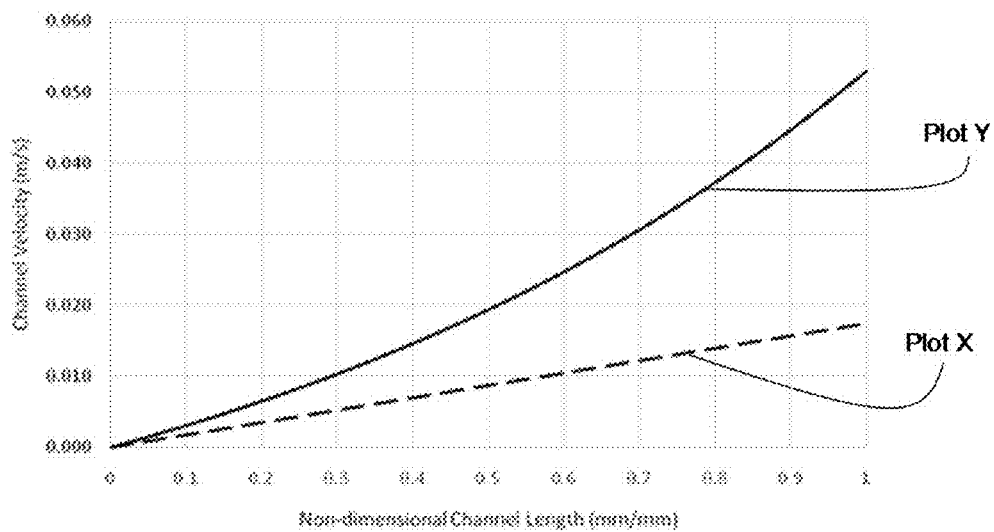
FIG. 6B is a graph showing fluid flow velocity along electrolyzer anode flow channels with two different profiles, modeled for an electrolyzer operating at a lower reactant water stoichiometry than in FIG. 6A.

The graph shown in FIG. 6A illustrates the fluid flow velocities, as generated by the model, for an electrolyzer in which the reactant water is also used for thermal management. Plot A (dashed line) shows the velocity for a channel with a constant profile, and plot B (solid line) shows the velocity for a compensated channel. The graph shown in FIG. 6B illustrates the fluid flow velocities, as generated by the model, for an electrolyzer in which the reactant water stream is separate from the coolant water stream supplied to the electrolyzer. Plot X (dashed line) shows the velocity for a channel with a constant profile, and plot Y (solid line) shows the velocity for a compensated channel.

In both cases, the compensated channel produces a far larger increase in fluid flow velocity down the channel. In the case where the reactant water is also used for thermal management, the compensated channel increases velocity 4.86 times the inlet velocity, whereas the constant profile channel only achieves 1.62 times the inlet velocity. In the case where the reactant water and coolant water streams are separate, the compensated channel multiplies the inlet velocity 1,244 times, versus 414 times for the constant profile channel. In both cases, however, the advantage in the ratio of inlet velocity to outlet velocity can be written as:

$$\left(\frac{v_{out}}{v_{in}}\right)_{comp.} \bigg/ \left(\frac{v_{out}}{v_{in}}\right)_{non-comp.} = \left(\frac{1}{ST_{H_2O} - 1} + 1\right) \quad (18)$$

In short, the lower the reactant water stoichiometry, the greater the advantage of the compensated channel versus the constant profile channel in terms of velocity multipliers.

When used at the cathode during operation of a URFC in fuel cell mode, channels with an exponentially varying width can be used to provide substantially constant oxygen availability, significantly improving the uniformity of current density and increasing fuel cell performance. They also provide velocity control allowing for more efficient fuel cell operation, conventionally achieved, in fuel cells through the use of serpentine flow fields. In electrolyzer operation serpentine flow fields are not optimum, shorter channels being preferred. Use of channels with an exponentially varying width in a PEM URFC can therefore provide velocity control for improved fuel cell operation, while achieving a shorter channel length that is generally preferred for electrolyzer operation.

Typically electrolyzers operating in reverse as fuel cells tend to perform poorly due to differences in catalyst layer composition. Electrolyzers are generally designed to operate with higher pressure differentials than fuel cells, therefore requiring stronger and heavier components for the membranes, gas distribution layers, flow field plates, and other system components, but they are therefore a less optimal system for running in reverse. Cathode flow field channels similar to those described herein have already been shown to improve the performance and efficiency of a fuel cell (see U.S. Pat. No. 7,838,169).

With the discovery that they can offer advantages at an electrolyzer anode (or even if they are neutral for electrolysis mode) they can make the URFC design more competitive. This will allow URFC to become more commercially viable. For example, a 5.6 kW electrolyzer having flow field channels that vary in cross-sectional area as described herein, will provide about 1.7 kW of peak power when run in reverse, in fuel cell mode. Comparatively, a standard flow field can only provide between 0.8 and 1.35 kW at peak power in fuel cell mode, and can require 50% to 28% more active area to produce 1.7 kW, leading to a more expensive URFC. The improved efficiency as defined by the relationship of peak power consumption under electrolyzer mode to peak power output in fuel cell mode for the same stack with the same total active area, therefore results in a lower cost URFC.

The channels can be substantially straight from inlet to outlet, or can be wavy or serpentine. Generally for electrolysis applications shorter channels are preferred, but for URFC the channel profile and path can be a compromise between what is preferred for fuel cell operation and what is preferred for electrolyzer operation.

Flow fields based on the equations and description set forth above for the oxygen electrode (anode) of an electrolyzer are more likely to be adopted if they can be accommodated within conventional flow field plate geometries and into conventional electrochemical stack architectures (which typically have rectangular flow field plates). Flow channels where the depth profile changes along the length of the channel (such as shown in FIG. 4B) can be accommodated by using an existing flow field design (pattern) and merely altering the depth profile of the channels along their length (keeping the channel width and ribs the same as in the original flow field design). However, plates with channels where the depth profile changes are generally more challenging to fabricate. They also result in a need for thicker plates, in order to accommodate the deepest part of the channel, leading to decreased stack power density and higher cost.

Figure 7:
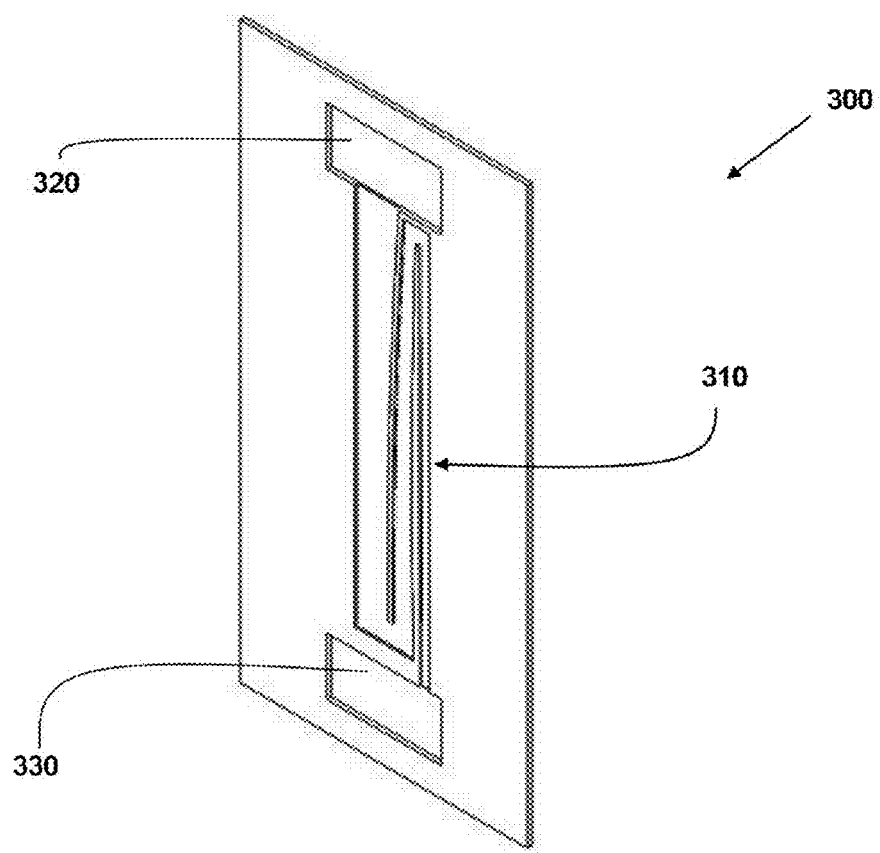
FIG. 7 is a simplified representation showing an example of how a serpentine flow channel, in which the channel width varies, can be applied to a rectangular flow field plate.
Figure 8A:
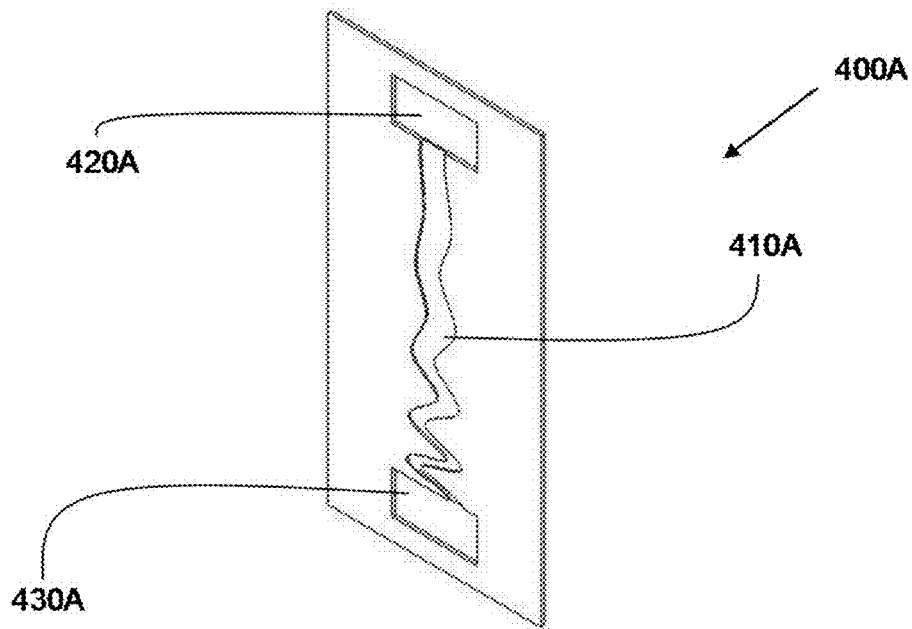
FIG. 8A is a simplified representation showing an example of how a wavy flow channel, in which the channel width varies, can be applied to a rectangular flow field plate.
Figure 8B:
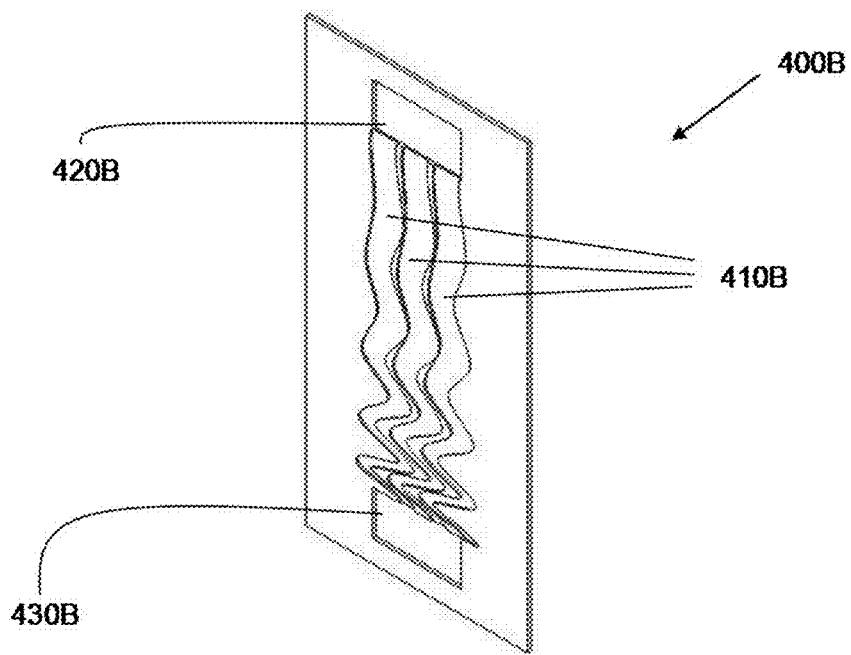
FIG. 8B is a simplified representation showing an example of how multiple wavy flow channels can be nested on a rectangular flow field plate.

FIGS. 7-9 show some examples of ways in which flow fields where the flow channel width varies, can be applied to a rectangular electrolyzer flow field plate. FIG. 7 shows a rectangular electrolyzer flow field plate 300 with a serpentine channel 310 where the channel width is decreasing exponentially as it zigzags across the plate between supply manifold opening 320 and discharge manifold opening 330. FIG. 8A shows a rectangular electrolyzer reactant flow field plate 400A with a wavy channel 410A extending between reactant supply manifold opening 420A and discharge manifold opening 430A, where the channel width is decreasing exponentially along its length. In FIG. 8A the amplitude of the path of the center-line of the flow channel 410A increases as the width of the channel decreases, so that the channel still occupies most of the width of the plate 400A. Making the variable width channel serpentine or wavy, rather than straight, allows the channel to occupy a more rectangular shape making more efficient use of the surface area of the plate. FIGS. 7 and 8A show a single flow channel, however, it is apparent that such channels can be repeated or arrayed across a rectangular plate so that a large portion of the plate area can be active area (for example, so that a large portion of the plate surface is covered in channels, with a large open channel area exposed to the adjacent electrode or MEA). FIG. 8B shows a rectangular electrolyzer flow field plate 400B with multiple flow channels 410B like flow channel 410A of FIG. 8A repeated) extending between reactant supply manifold opening 420B and discharge manifold opening 430B, arranged so that the channels nest together.

Figure 9A:
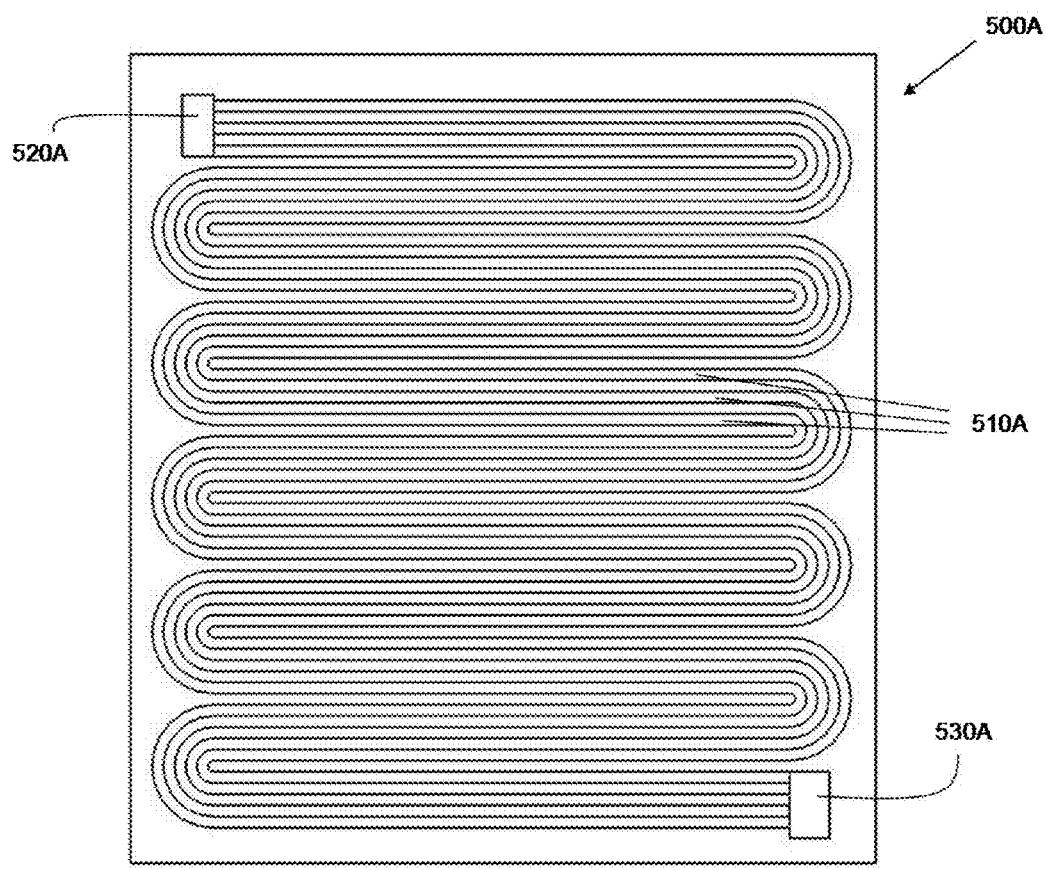
FIG. 9A (Prior Art) shows a square flow field plate comprising a conventional serpentine flow field with 3 flow channels extending between a supply manifold opening and a discharge manifold opening.
Figure 9B:
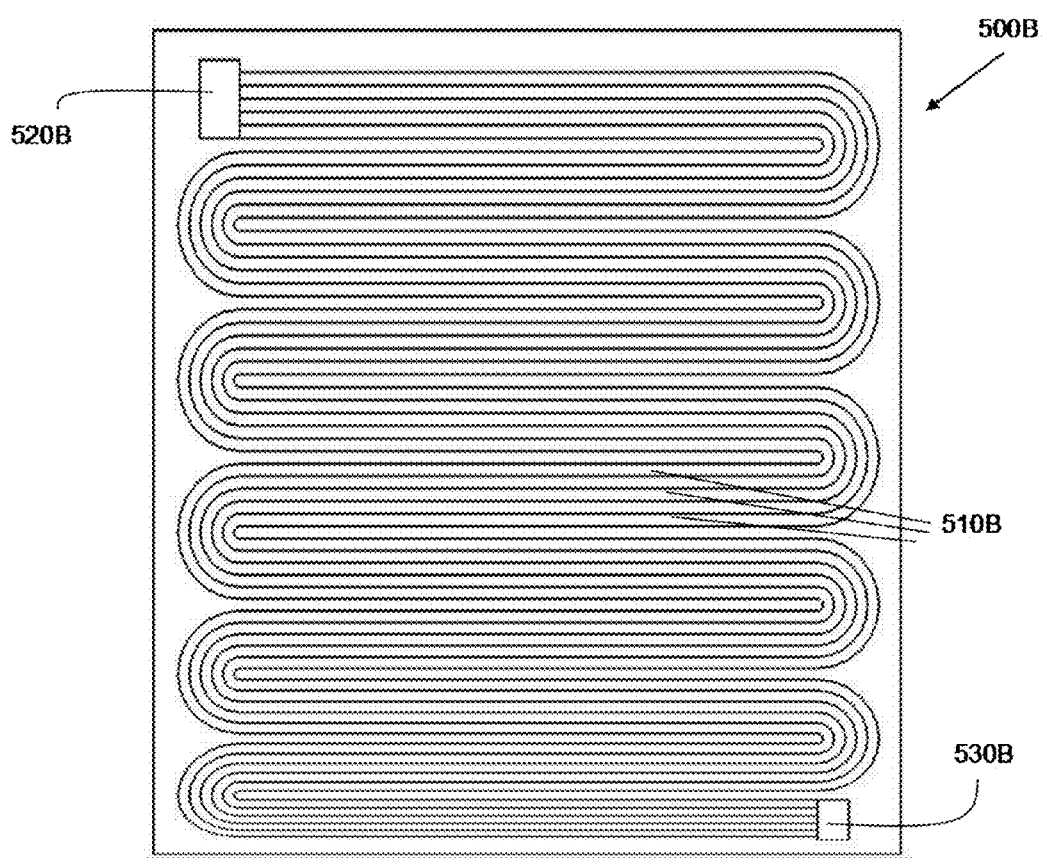
FIG. 9B shows a similar serpentine flow field to FIG. 9A, but where the width of each serpentine flow channel decreases exponentially along its length.

FIG. 9A shows a square electrolyzer flow field plate 500A comprising a conventional (Prior Art) serpentine electrolyzer flow field with three flow channels 510A extending between supply manifold opening 520A and discharge manifold opening 530A. FIG. 9B shows a similar serpentine electrolyzer flow field plate 500B, but where the width of each serpentine channel 510B decreases exponentially along its length as it extends from supply manifold opening 520B to discharge manifold opening 530B.

Figure 10A:
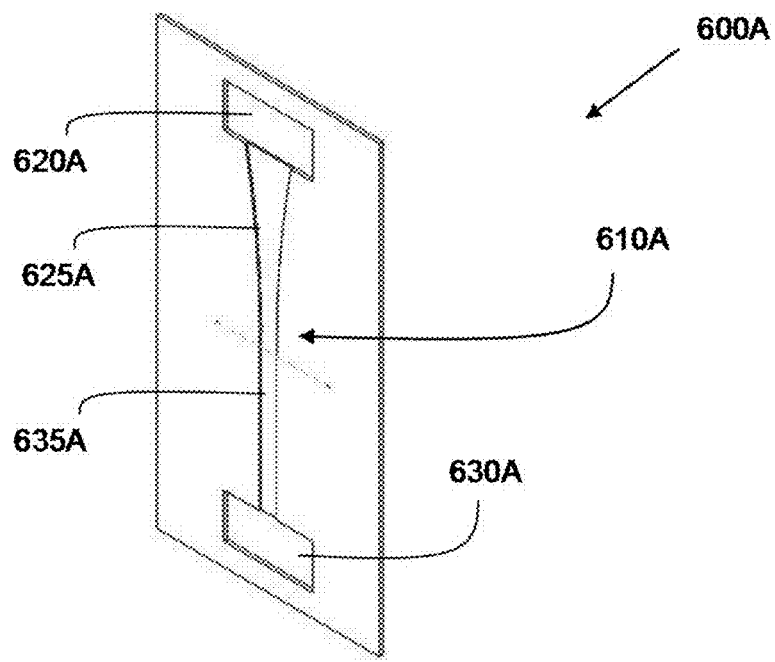
FIG. 10A is a simplified representation of a flow field plate comprising a flow channel that decreases exponentially in width for a first portion of the channel length and is then constant for a second portion of the channel.
Figure 10B:
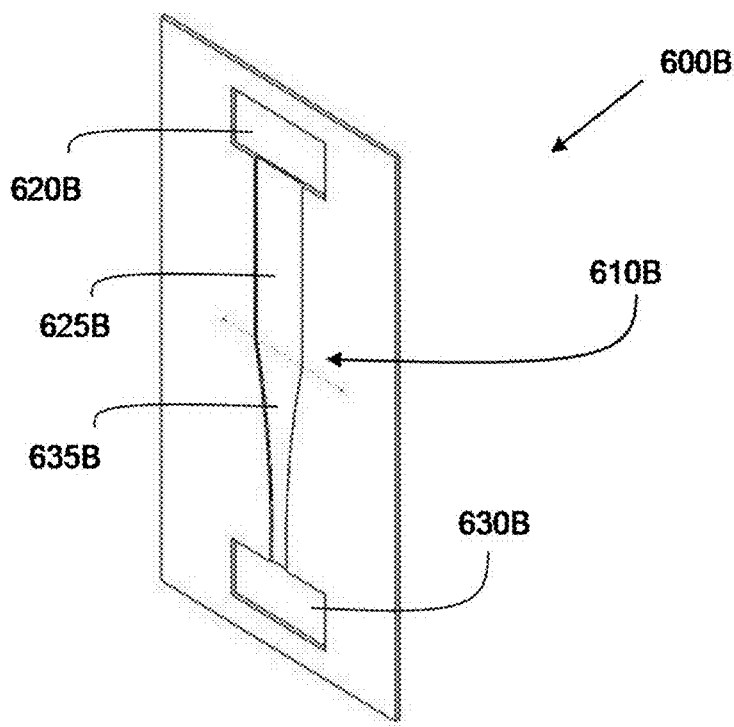
FIG. 10B is a simplified representation of a flow field plate comprising a flow channel that is constant in width a first portion of the channel length and decreases exponentially for a second portion of the channel length.
Figure 11:
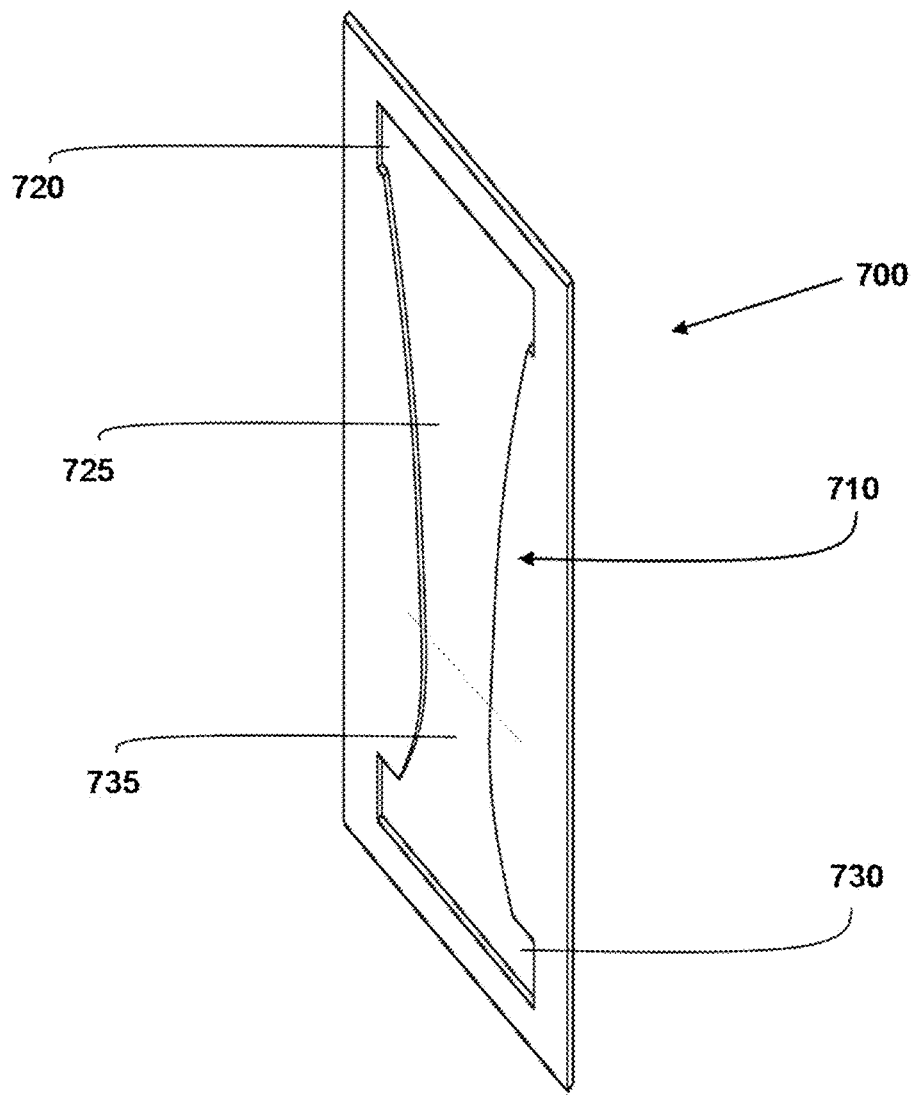
FIG. 11 is a simplified representation of a flow field plate comprising a flow channel that decreases exponentially in width for a first portion of the channel length, and then flares with increasing channel width along a second portion of the channel length.
Figure 12:
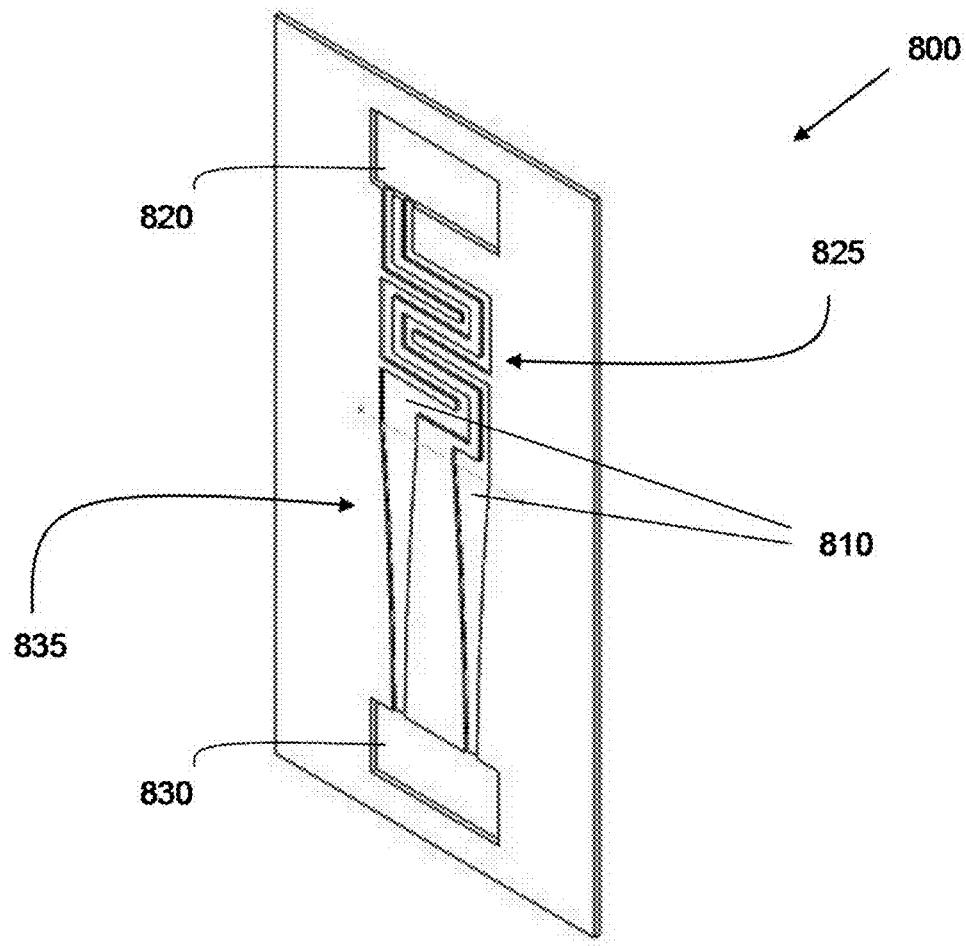
FIG. 12 is a simplified representation of a flow field plate comprising two flow channels that are serpentine with constant width for a first portion of the channel length, and then the channel width decreases exponentially for a second portion of the channel length.

Improvements in electrolyzer performance can be obtained by incorporating a variation in channel cross-sectional area along only a portion of the length of the reactant flow channel. The performance improvements are not necessarily as great as if the variation is employed along the entire channel length, but such flow field designs can in some cases provide most of the benefit, and can allow more efficient use of the plate area. FIGS. 10-12 show some examples where the flow channel width varies along just a portion of the length of the channel. FIG. 10A shows a rectangular electrolyzer flow field plate 600A with a flow channel 610A extending between reactant supply manifold opening 620A and discharge manifold opening 630A. Similarly, FIG. 10B shows a rectangular electrolyzer flow field plate 600B with a flow channel 610B extending between reactant supply manifold opening 620B and discharge manifold opening 630B. In FIG. 10A, the flow channel width decreases exponentially for a first portion 625A of the channel length (near the supply manifold), and is then constant for a second portion 635A of the channel length (towards the discharge manifold). Conversely, in FIG. 10B the flow channel width is constant for a first portion 625B and decreases exponentially for a second portion 635B of the channel length.

In some cases it can be beneficial to incorporate a decrease in channel cross-sectional area (in accordance with the above equations for constant water availability) along a first portion of the length of the channel and then incorporate an increase in channel cross-sectional area along a second portion of the length of the channel, in order to help accommodate the significant (approximately 600×) change in volume when oxidizing water to oxygen. FIG. 11 shows a rectangular electrolyzer flow field plate 700 with a flow channel 710 extending between reactant supply manifold opening 720 and discharge manifold opening 730. The flow channel width decreases exponentially for a first portion 725 of the channel length (near the supply manifold), and is then increases so that the channel is flared for a second portion 735 of the channel length.

FIG. 12 shows an electrolyzer flow field plate 800 comprising two flow channels 810. The channels are initially serpentine with constant width in portion 825 near the reactant supply manifold opening 820, and then, after abruptly increasing, the channel width decreases exponentially for a second portion 835 of the channel length (towards discharge manifold opening 830).

Figure 13:
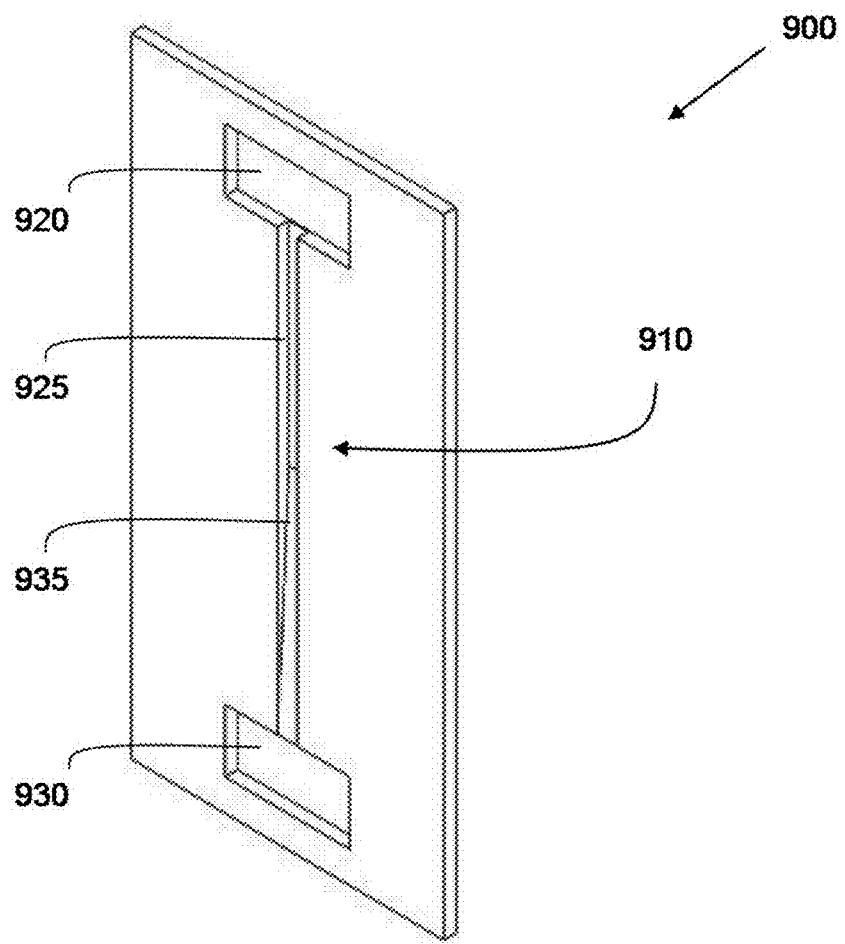
FIG. 13 is a simplified representation of a now field plate comprising a flow channel in which the channel depth is constant along a first portion of the channel length and then decreases along second a portion of the channel length.

FIG. 13 shows an example of an electrolyzer flow field plate 900 comprising a flow channel 910 extending between a reactant supply manifold opening 920 and a discharge manifold opening 930. The flow channel depth is constant along a first portion 925 of the channel length and then decreases along a second portion 935 of the length of the channel 910.

In some embodiments, the electrolyzer flow channels can incorporate a variation in both width and depth along their entire length, or a portion of their length.

Figure 14A:
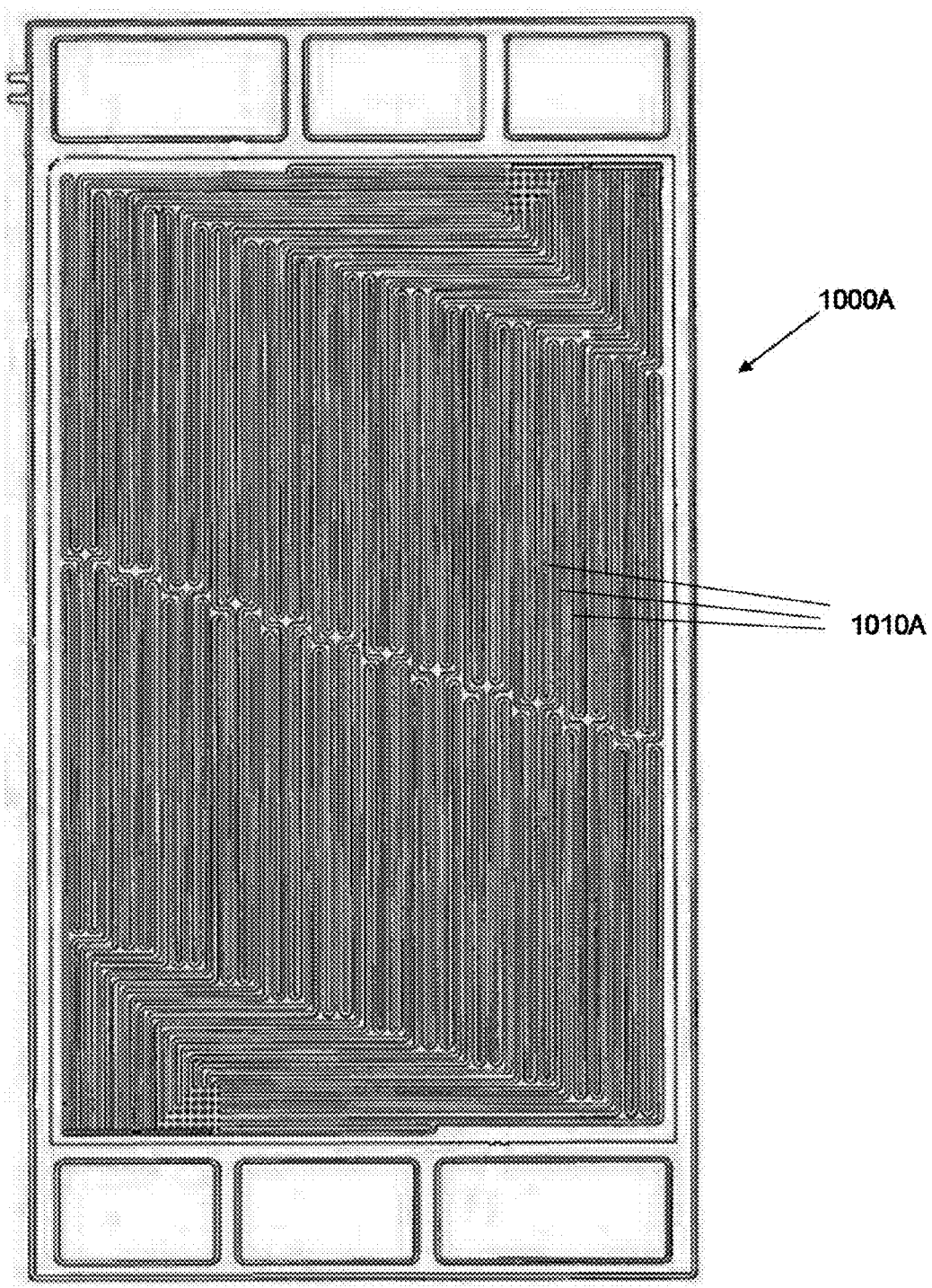
FIG. 14A (Prior Art) shows a rectangular flow field plate comprising a multi-channel serpentine flow field extending between a supply and a discharge manifold opening.
Figure 14B:
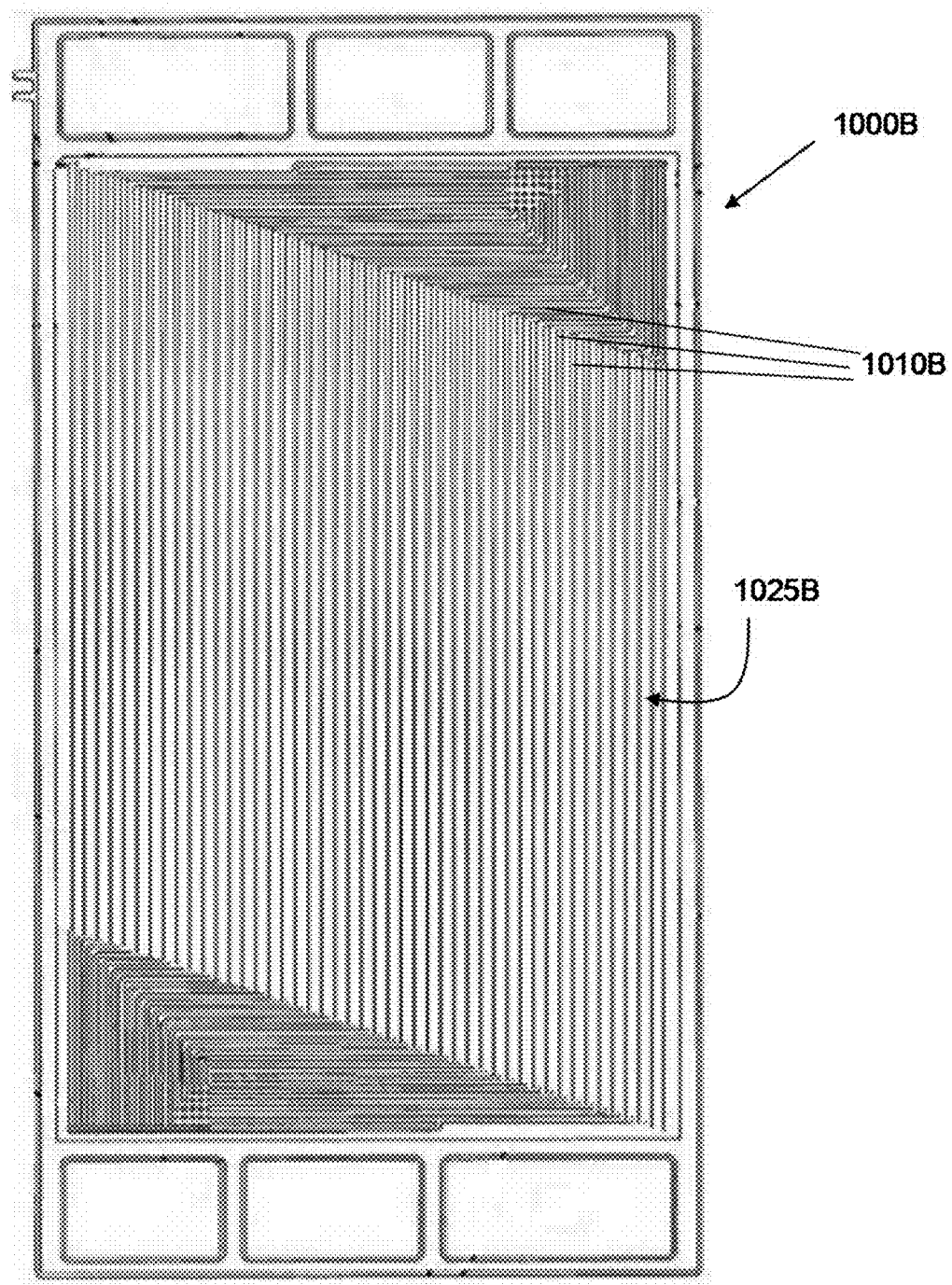
FIG. 14B shows a modification to the flow field plate of FIG. 14A, in which the width of each channel decreases exponentially along a middle portion of the length of each channel.

FIGS. 14A and 14B illustrate how an existing flow field design can be readily modified to incorporate an exponential variation in channel width along a portion of the length of the flow channels. FIG. 14A (Prior Art) shows a rectangular flow field plate 1000A comprising a fairly complex serpentine flow field with multiple serpentine channels 1010A extending between a supply and a discharge manifold opening. FIG. 14B shows a modification in which the width of each channel 1010B decreases exponentially along a middle portion 1025B of the length of each channel.

Figure 15:
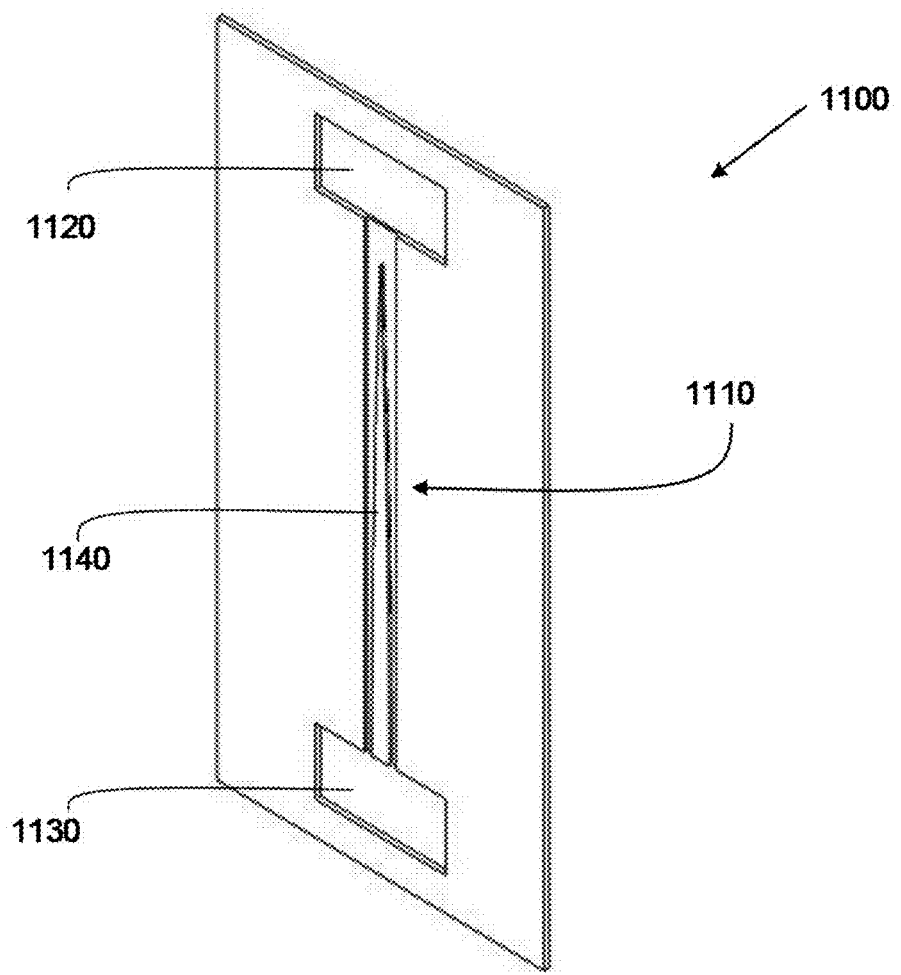
FIG. 15 is a simplified representation of a flow field plate comprising a substantially rectangular flow channel having a central rib with exponentially curved side walls.
Figure 16A:
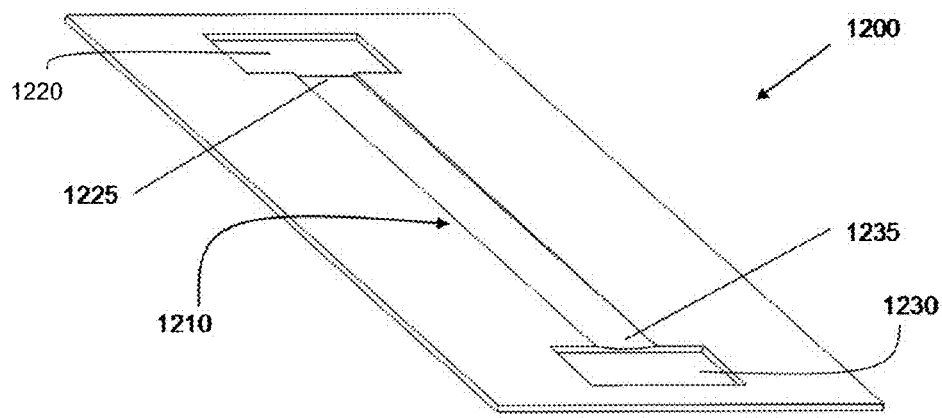
FIG. 16A is a simplified representation of a flow field plate comprising a flow channel that has a conventional rectangular cross-section at one end and is gradually filleted to reduce its cross-section towards the other end, in the reactant flow direction.
Figure 16B:
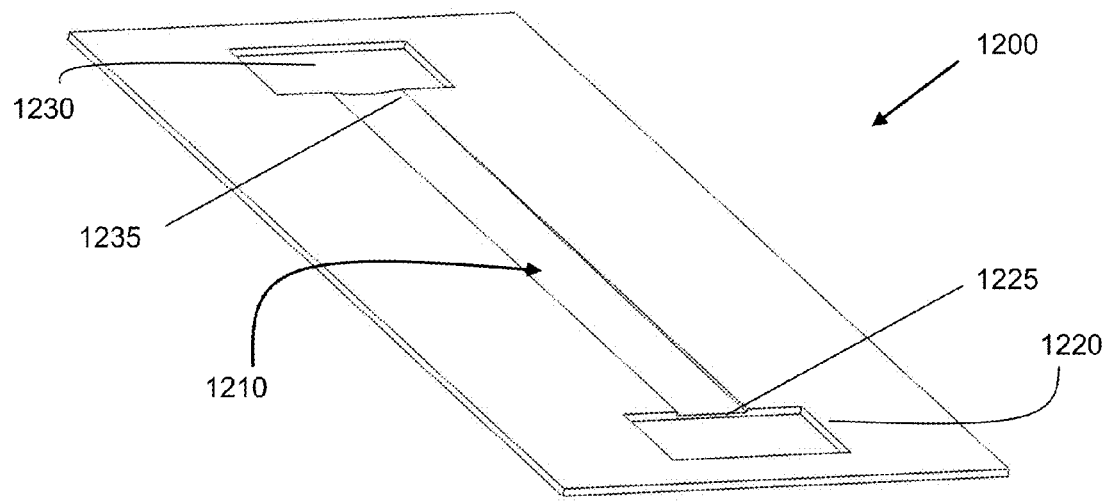
FIG. 16B is an alternative view of the flow field plate of FIG. 16A.

It is also possible to take a conventional flow channel (for example, a channel with a rectangular and constant cross-sectional shape and area along its length) and incorporate a shaped rib, fillet or other features within the volume of the original channel to reduce the channel cross-sectional area in a way that provides at least some of the desired benefits. FIG. 15 shows an example of an electrolyzer flow field plate 1100 with a single flow channel 1110 extending between a supply manifold opening 1120 and a discharge manifold opening 1130. The channel 1110 comprises a central rib 1140 with exponentially curved side walls. The rib splits the flow channel 1110 in two and effectively reduces its width gradually along most of its length. FIGS. 16A and 16B show two different views of another example of a flow field plate 1200 with a single flow channel 1210 extending between a supply manifold opening 1220 and a discharge manifold opening 1230. The channel 1210 is of a conventional rectangular cross-section at one end 1225, and is gradually filleted to reduce its cross-section towards the other end 1235.

Figure 17:
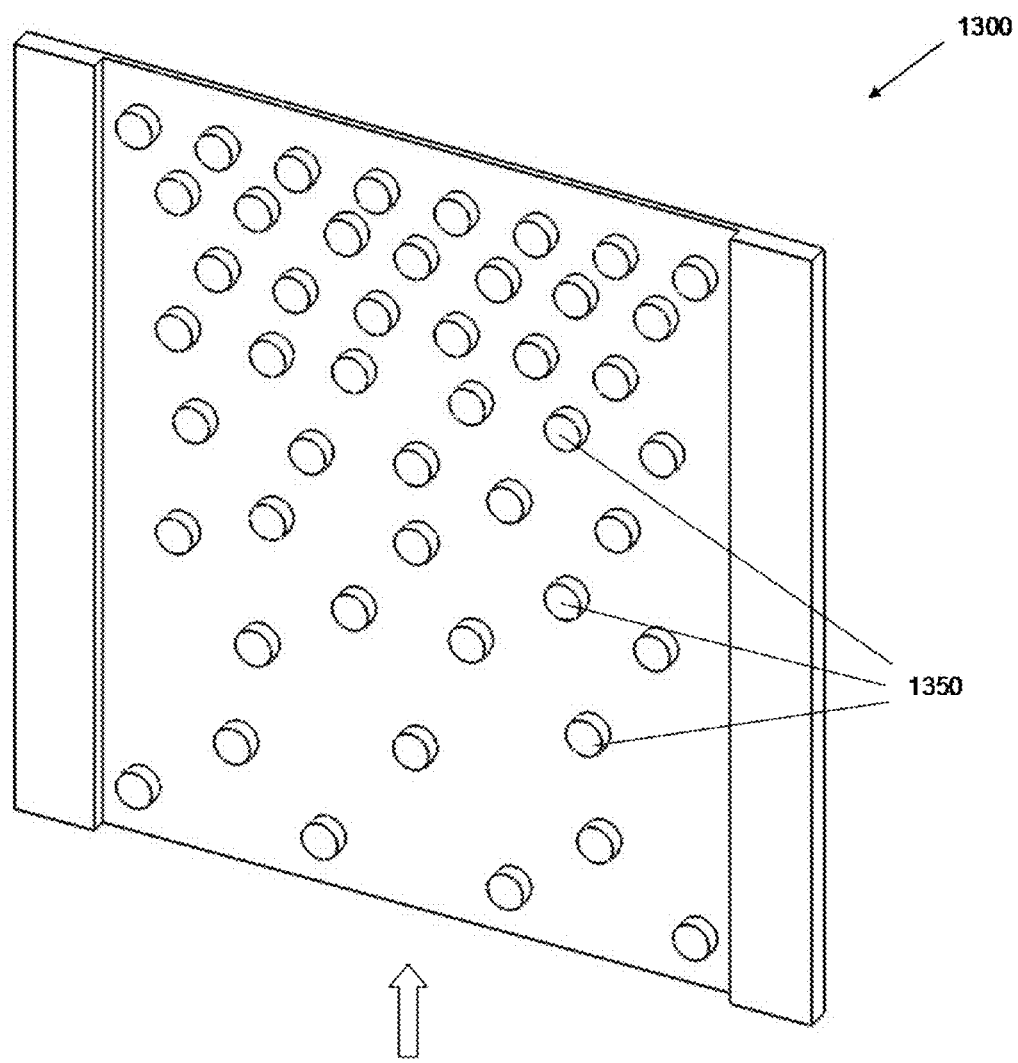
FIG. 17 is a simplified representation of a flow field plate comprising a rectangular flow channel incorporating rib dots, where density of the rib dots increases in the reactant flow direction.
Figure 18:
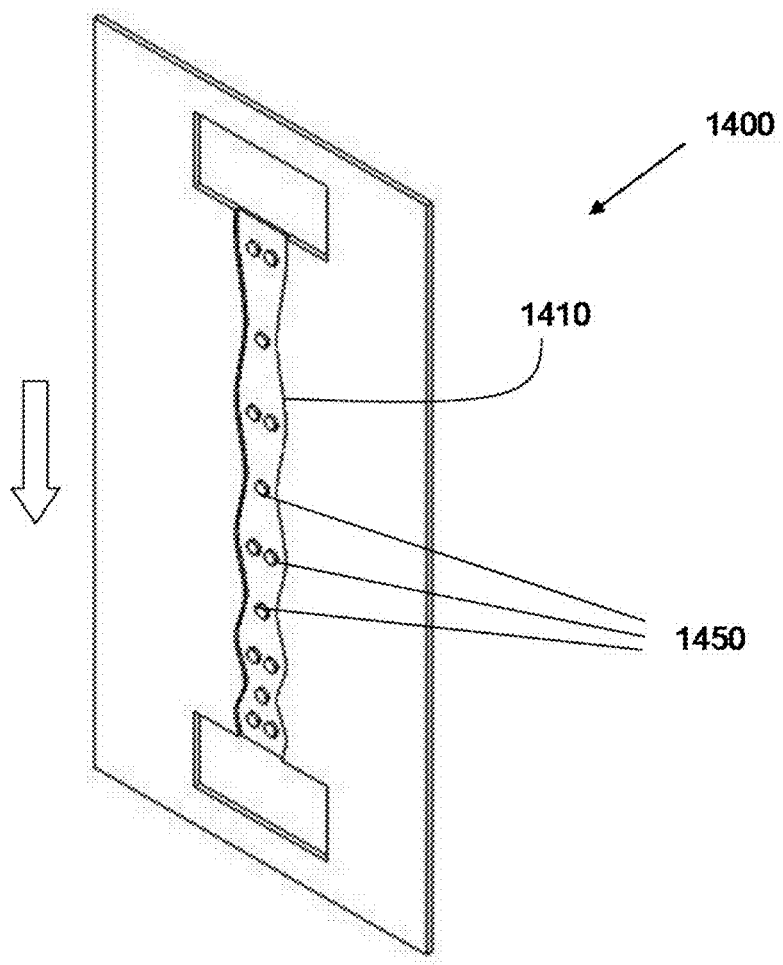
FIG. 18 is a simplified representation of a flow field plate comprising a wavy flow channel incorporating rib dots, where density of the rib dots increases in the reactant flow direction.

In the examples described above, the flow channel dimensions vary along at least a portion of the channel length in a smooth and continuous fashion. However, performance benefits can also be obtained by using flow channels that incorporate discrete variations. In other words, the characteristics of the channel can be varied as a function of distance along the channel in a stepwise or discontinuous fashion, but where the overall variation trends the smooth desired profile, either in fluctuations about the calculated profile, or in discrete approximations of the desired profile. This approach can be used to achieve at least some of the performance benefits, and can provide some options for improved flow fields that are easier to fabricate or to incorporate into existing plate geometries. In these examples, the outlet, or region near the outlet, is smaller or more constricted than the reactant inlet or inlet region. In some embodiments, the channels can contain discrete features that obstruct reactant flow, where the density and/or size of those features increases in a reactant flow direction. An example of an electrolyzer flow field plate 1300 where the flow channels incorporate rib dots or raised columns 1350 is shown in FIG. 17. The density of the rib dots 1350 can increase in the reactant (water) flow direction (indicated by the arrow) in accordance with the e flow equations. Such features can be as high as the channel is deep (so that they touch the adjacent electrode) or can obstruct only part of the channel depth. In the example illustrated in FIG. 17, the channel is the entire active area and the rib dots (or other such features that obstruct reactant flow) are distributed, across the active area in a varied density array approximating an exponential variation. In other examples, the rib dots or other features can be incorporated into one or more separate channels. FIG. 18 is a simplified representation of an electrolyzer flow field plate 1400 comprising a wavy flow channel 1410 incorporating rib dots 1450, where the density of the rib dots increases in a reactant flow direction (indicated by the arrow).

In other examples, the flow channel dimensions (for example, width or depth) can decrease in the reactant flow direction in a stepwise fashion. The increments by which the dimensions change and the distance between the step-changes are selected so that the changes in channel dimensions in the reactant flow direction are consistent with the applicable equations. In some embodiments the increments by which the channel dimensions change can be the same along the channel length, and in other embodiments it can vary along the channel length. Similarly, in some embodiments the distance between (or frequency of) the step-changes in channel dimensions can be the same along the channel length, and in other embodiments it can vary along the channel length.

Figure 19:
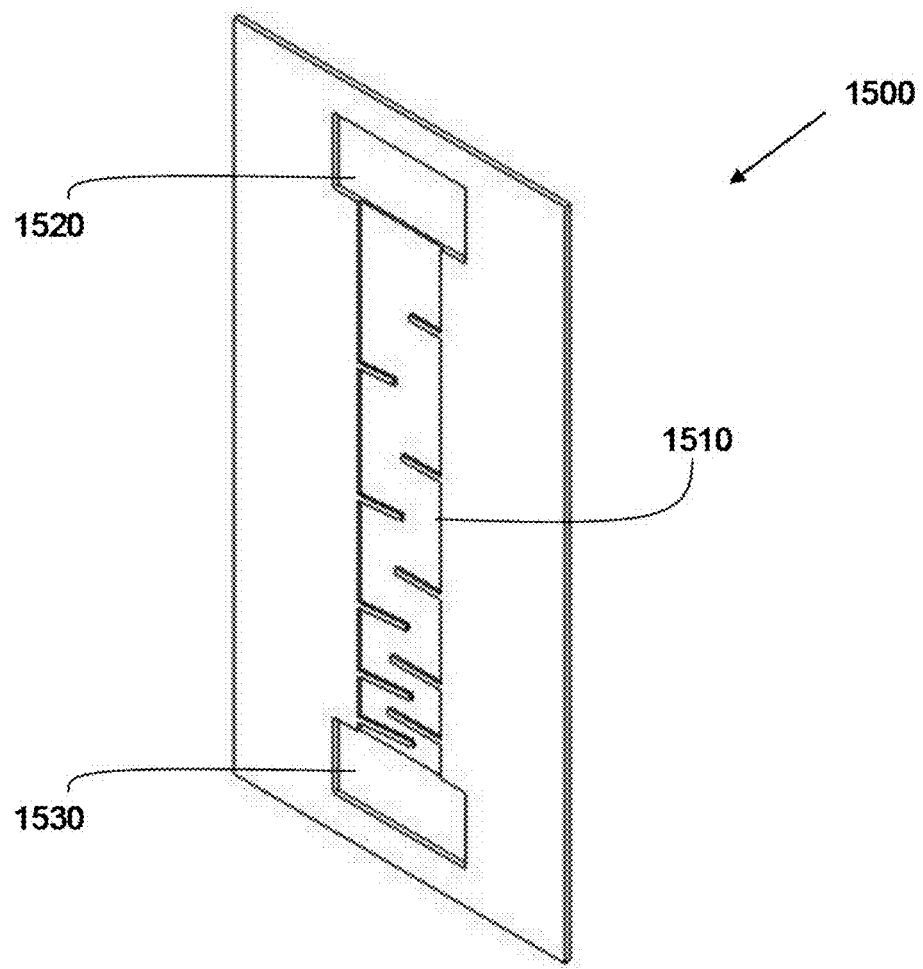
FIG. 19 is a simplified representation illustrating an example where the flow channel width decreases in a stepwise, non-linear fashion in the reactant flow direction.
Figure 20:
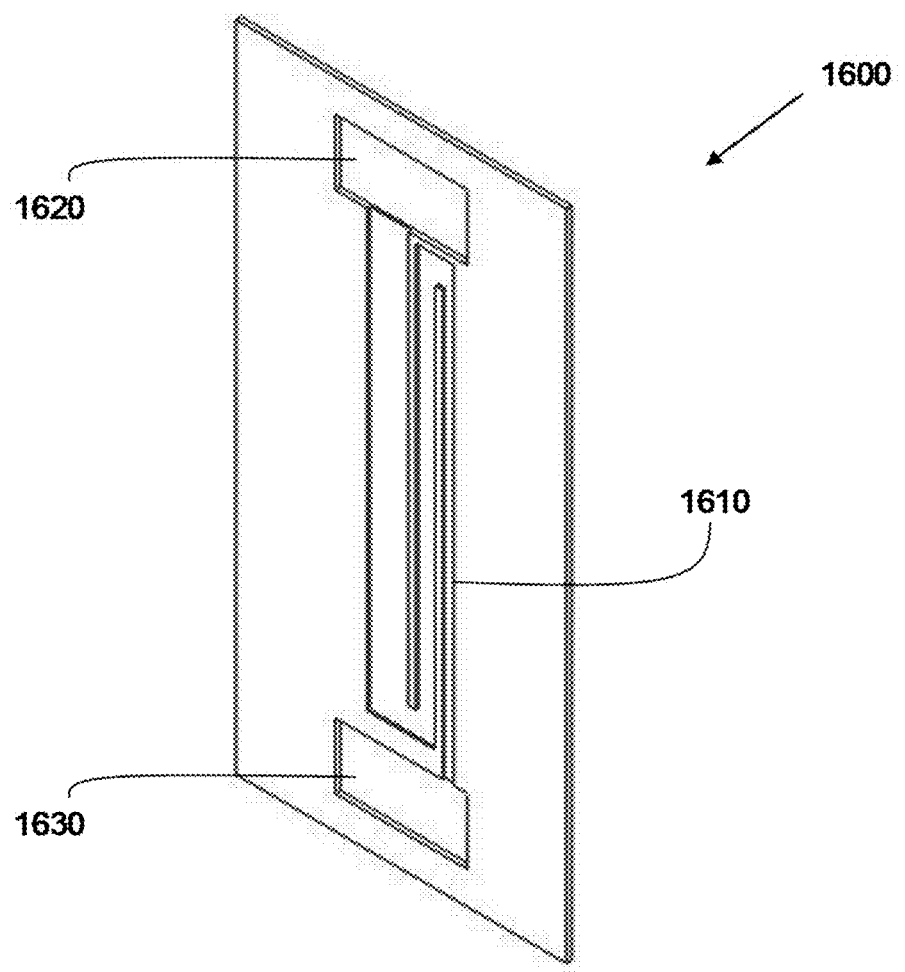
FIG. 20 is a simplified representation illustrating another example where the flow channel width decreases in a stepwise, non-linear fashion in the reactant flow direction.

FIGS. 19 and 20 illustrate examples here the channel, width decreases in a stepwise, non-linear fashion in a reactant flow direction in accordance an exponential function. FIG. 19 is a simplified representation illustrating an example electrolyzer flow field plate 1500 where the width of flow channel 1510 decreases in a stepwise, nonlinear fashion in a reactant direction between a reactant supply manifold opening 1520 and a discharge manifold opening 1530. FIG. 20 is a simplified representation illustrating another example electrolyzer flow field plate 1600 where the width of flow channel 1610 decreases in a stepwise, non-linear fashion in the reactant flow direction between a supply manifold opening 1620 and a discharge manifold opening 1630.

Figure 21:
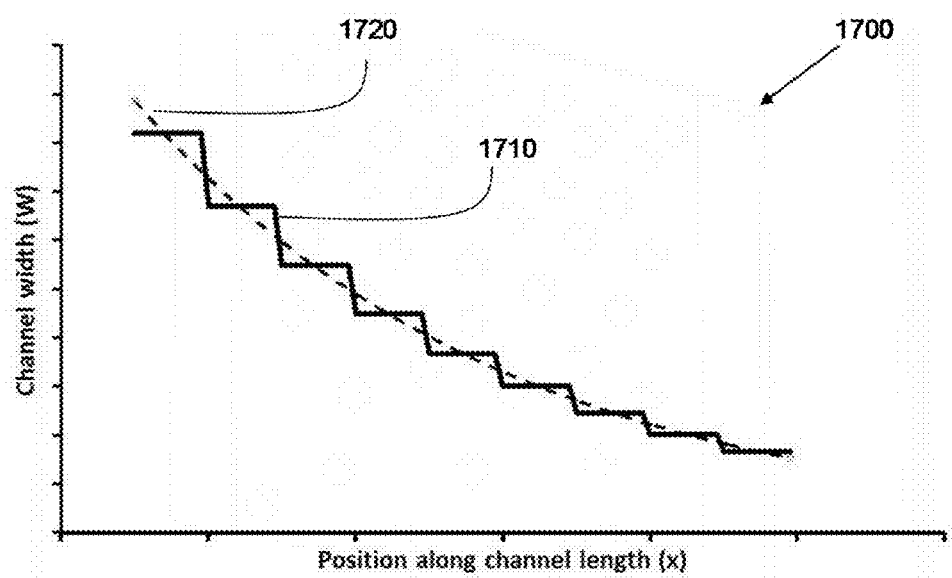
FIG. 21 is a graphical representation illustrating how stepwise or discrete changes in channel with can be used to approximate a smooth exponential change in channel width.

FIG. 21 is a graphical representation 1700 illustrating how stepwise or discrete changes in channel width can be used to approximate a smooth exponential change in channel width. The solid line 1710 represents changes in channel width and the dashed line 1720 shows a smooth exponential variation in channel width.

In other examples the porosity of the flow channel varies based the principles explained above.

Figure 22:
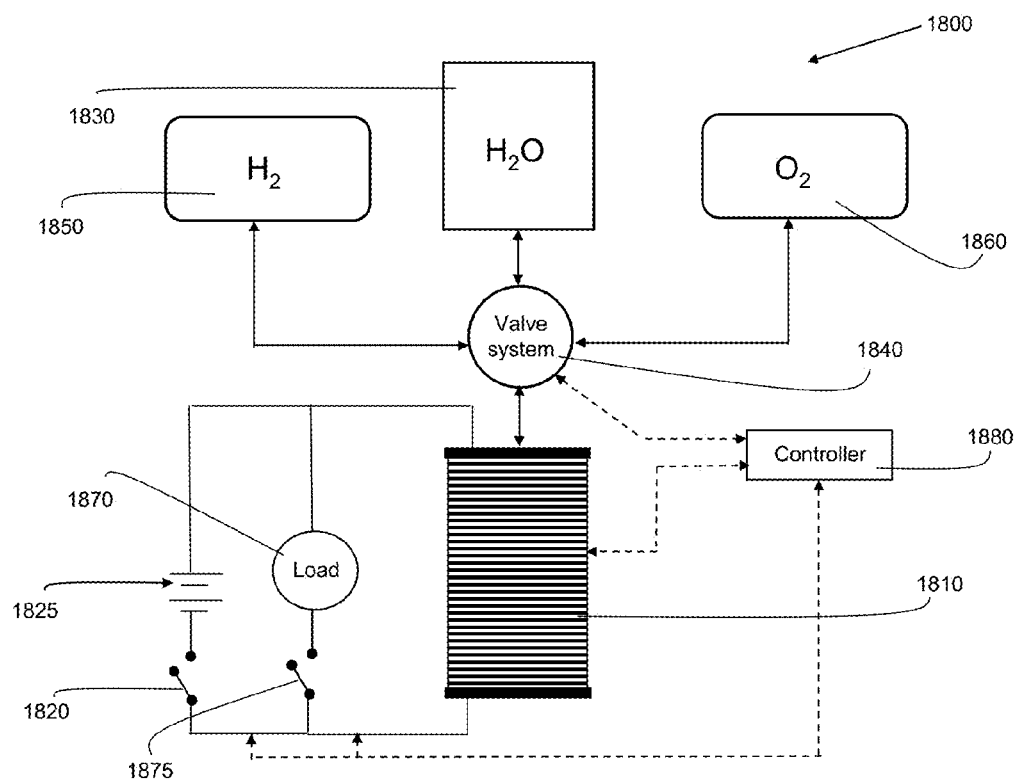
FIG. 22 is a block diagram of an electrolyzer/regenerative fuel cell system.

FIG. 22 is a block diagram illustrating an example of an electrolyzer/regenerative fuel cell system 1800 comprising a multi-cell stack 1810. Each unit cell in the stack can comprise components and flow channels such as, for example, those described above. System 1800 also comprises a power supply 1825, which can be connected by closing switch 1820, to deliver electrical power to stack 1810 when stack 1810 is to be operated in electrolyzer mode to generate hydrogen and oxygen. Power supply 1825 can comprise, for example, an electricity grid, an energy storage device, or a renewable source of electric power such as a photovoltaic cell or a wind turbine. When system 1800 is to be operated in electrolyzer mode, water is supplied to flow channels within stack 1810 from a water supply 1830 via a valve system 1840 which can comprise multiple valves for controlling the supply of fluids (reactants and products) to and from stack 1810. Water can be supplied as both a reactant and a coolant to flow channels adjacent the oxygen-side electrodes (not shown in FIG. 22) in stack 1810; or water can be supplied as a reactant to flow channels adjacent the oxygen-side electrodes, and optionally to separate cooling channels (not shown in FIG. 22) in stack 1810. System 1800 also comprises a hydrogen containment vessel 1850 selectively fluidly coupleable, via valve system 1840, to collect hydrogen generated during electrolyzer operation of stack 1810. System 1800 further comprises an oxygen containment vessel 1860 selectively fluidly coupleable, via valve system 1840, to collect oxygen generated during electrolyzer operation of stack 1810.

System 1800 can also be configured so that stack 1810 operates as a fuel cell to generate electric power which can power electrical load 1870 when switch 1875 is closed (and switch 1820 is open). In this mode of operation, hydrogen can be supplied to stack 1810 from hydrogen containment vessel 1850 which is selectively fluidly coupleable to supply hydrogen to stack 1810, via valve system 1840. Similarly, oxygen can be supplied to stack 1810 from oxygen containment vessel 1850 which is also selectively fluidly coupleable to supply oxygen to stack 1810, via valve system 1840. Alternatively air can be supplied to stack 1810 as the oxidant, via another oxidant supply subsystem (not shown in FIG. 22). During fuel cell operation, water can optionally be supplied as a coolant to cooling channels (not shown in FIG. 22) in stack 1810 via valve system 1840. Product water generated during fuel cell operation can optionally be directed to water supply 1830 via valve system 1840. A controller 1880 can operate the valve system 1840 to provide reactants and coolant to and collect products from stack 1810, as appropriate, during fuel cell and electrolyzer operation. Controller 1880 can also close and open switches 1820 and 1875, as appropriate, for fuel cell and electrolyzer operation. Controller 1880 can also configure stack 1810 for operation alternatively in fuel cell mode and electrolyzer mode.

System 1800 is one embodiment of a system comprising a regenerative fuel cell/electrolyzer stack. Other systems can exclude some of the components shown in system 1800, or include additional components.

FIGS. 4A, 4B, 7, 8A, 8B, 10A, 10B, 11, 12, 13, 15, 16A, 16B, 17, 18, 19 and 20 are simplified drawings, in which the size of the flow channel and the manifold openings, and variations in channel dimensions and/or characteristics are exaggerated for the purposes of clear illustration.

In the above-described embodiments, the dimensions and/or flow characteristics of the flow channel vary along at least a portion of the channel length. The variations can be continuous or discrete.

Although the focus of the foregoing description has been on the oxygen-side, flow channels with variations in cross-sectional area as described herein can be used at either or both of the electrodes in an electrolyzer or URFC assembly. However, as described above, they generally offer greater benefits when used at the oxygen-side electrode (which is the anode for an electrolyzer, and the cathode during fuel cell operation of a URFC). Also they can be used for some or all of the unit cells in a particular electrolyzer or URFC stack.

The open channel area versus the rib or landing area on a reactant flow field plate is generally selected to give sufficient electrical contact between the plates and the adjacent MEAs for efficient current delivery, while providing sufficient water access to the electrolyzer anode to support the electrochemical reactions. Using a wider rib area (between flow channels) improves electrical connectivity and current delivery in an electrolyzer.

As used herein the "inlet" refers to either the start of the flow channel where reactant enters the channel, or the start of a region where the channel characteristics vary as a function of channel length as described herein; and "outlet" refers to either the downstream end of the channel, or the end of a region over which channel characteristics vary as a function of channel length as described herein.

Electrolyzer flow field plates can include reactant flow channels or flow field designs as described above. Such plates can be made from suitable materials or combination of materials, and can be fabricated by suitable methods. Flow channels or passageways as described above can also be incorporated into other electrolyzer components. For example, such channels could be incorporated into the gas diffusion layers, manifolds, or other components of the unit cell or stack. Further electrolyzers and electrolyzer stacks can also incorporate these flow field plates and/or other components. The reactant flow channels and flow field designs described herein have been found to be particularly advantageous in PEM electrolyzer assemblies and URFCs, however they can be applied in other types of electrochemical devices.

Where a component is referred to above, unless otherwise indicated, reference to that component should be interpreted as including as equivalents of that component and components which perform the function of the described component (namely, that is functionally equivalent), including components which are not structurally equivalent to the disclosed structure but which perform the function in the illustrated exemplary embodiments.

While particular embodiments and applications of the present invention have been shown and described, it will be understood, of course, that the invention is not limited thereto since modifications can be made by those skilled in the art without departing from the scope of the present disclosure, particularly in light of the foregoing teachings. For example, features from the embodiments described herein can be combined with features of other embodiments described herein to provide further embodiments. The changes and alternatives are considered within the spirit and scope of the present invention.

What is claimed is:

1. An electrolyzer assembly for generating hydrogen and oxygen from water, said electrolyzer assembly comprising:
    a first unit cell wherein said first unit cell comprises:
    (a) a membrane electrode assembly comprising a proton exchange membrane interposed between an anode and a cathode;
    (b) a cathode flow field plate adjacent to said cathode; and
    (c) an anode flow field plate adjacent to said anode, said anode flow field plate having an anode channel for directing water in contact with said anode, wherein said anode channel has a length, and a cross sectional area that varies along at least a portion of said length; wherein the depth of said anode channel is substantially constant, and the width of said anode channel decreases along at least a portion of said channel length in a direction of reactant flow according to a natural exponential function.

2. The electrolyzer assembly of claim 1, wherein said natural exponential function is a function of position along the length of said channel.

3. The electrolyzer assembly of claim 1, wherein said channel width decreases along substantially the entire length of said anode channel.

4. The electrolyzer assembly of claim 1, wherein the width of said anode channel is substantially constant for a portion of said channel length and said channel width varies along another portion of said channel length.

5. The electrolyzer assembly of claim 1, wherein said natural exponential function is:

$$W(x) = \frac{ST_{H_2O} k_{H_2O} i_t}{Dv} e^{\ln\left(\frac{ST_{H_2O}-1}{ST_{H_2O}}\right)\frac{x}{L}}$$

where W(x) is the anode channel width at lengthwise position x; x is a selected position along the channel length; D is the channel depth; v is constant flow velocity; $ST_{H_2O}$ is water stoichiometry; $k_{H_2O}$ is flow rate coefficient for water; $i_d$ is the total channel current; and L is the channel length.

6. The electrolyzer assembly of claim 5, further comprising a second unit cell wherein said first unit cell and said second unit cell are arranged in a stack.

7. The electrolyzer assembly of claim 6, further comprising a water supply configured to deliver water to said anode channels.

8. The electrolyzer assembly of claim 7, further comprising a power supply configured to deliver electrical power to said electrolyzer assembly.

9. The electrolyzer assembly of claim 8, further comprising a hydrogen containment vessel configured to collect hydrogen generated by said electrolyzer assembly.

10. The electrolyzer assembly of claim 9 further comprising an oxygen containment vessel configured to collect oxygen generated by said electrolyzer assembly.

11. The electrolyzer assembly of claim 10 wherein said electrolyzer assembly is configured to operate as a fuel cell to generate electric power and water when oxygen and hydrogen are supplied to said anodes and cathodes.

12. The electrolyzer assembly of claim 1, further comprising a second unit cell wherein said first unit cell and said second unit cell are arranged in a stack.

13. The electrolyzer assembly of claim 12 further comprising a water supply configured to deliver water to said anode channels.

14. The electrolyzer assembly of claim 13 further comprising a power supply configured to deliver electrical power to said electrolyzer assembly.

15. The electrolyzer assembly of claim 14 further comprising a hydrogen containment vessel configured to collect hydrogen generated by said electrolyzer assembly.

16. The electrolyzer assembly of claim 15 further comprising an oxygen containment vessel configured to collect oxygen generated by said electrolyzer assembly.

17. The electrolyzer assembly of claim 16 wherein said electrolyzer assembly is configured to operate as a fuel cell to generate electric power and water when oxygen and hydrogen are supplied to said anodes and cathodes.

18. An electrolyzer assembly for generating hydrogen and oxygen from water, said electrolyzer assembly comprising:
    a first unit cell wherein said first unit cell comprises:
    (a) a membrane electrode assembly comprising a proton exchange membrane interposed between an anode and a cathode;
    (b) a cathode flow field plate adjacent to said cathode; and (c) an anode flow field plate adjacent to said anode, said anode flow field plate having an anode channel for directing water in contact with said anode, wherein said anode channel has a length, and a cross sectional area that varies along at least a portion of said length; wherein the width of said anode channel is substantially constant, and the depth of said anode channel varies as a function of distance along said portion of said channel length such that:

$$D(x) = \frac{ST_{H_2O} k_{H_2O} i_d L}{v}\left(1 - \frac{x}{ST_{H_2O} L}\right)$$

where $D(x)$ is the anode channel depth at lengthwise position $x$; $x$ is a selected position along the channel length; $ST_{H_2O}$ is water stoichiometry; $k_{H_2O}$ is flow rate coefficient for water; $i_d$ is current density; and $L$ is the channel length.

19. A unitized regenerative fuel cell assembly configured to operate both as an electrolyzer to produce hydrogen and oxygen from water, and as a fuel cell to produce electric power from hydrogen and oxygen, said unitized regenerative fuel cell comprising a unit cell wherein said unit cell comprises:
(a) a membrane electrode assembly comprising a proton exchange membrane interposed between a first electrode and a second electrode;
(b) a first flow field plate adjacent to said first electrode, said first flow field plate comprising an oxygen-side channel for directing a first fluid stream in contact with said first electrode, said oxygen-side channel having a length and a cross-sectional area that varies along at least a portion of said channel length; and
(c) a second flow field plate adjacent to said second electrode, said flow field plate comprising a hydrogen-side channel for directing a second fluid stream in contact with said second electrode;

wherein for operation as an electrolyzer said one unit cell is connected to a source of electrical power and said one oxygen-side channel is fluidly connected to a water supply for flowing reactant water through said oxygen-side channel, and for operation as a fuel cell said oxygen-side channel is fluidly connected to receive an oxygen-containing reactant stream, said hydrogen-side channel is fluidly connected to receive a hydrogen-containing reactant stream, and said unit cell is connected to an electrical load; wherein the depth of said oxygen-side channel is substantially constant, and the width of said oxygen-side channel decreases along at least a portion of said channel length in a direction of water reactant flow during electrolyzer operation and in a direction of oxygen-containing reactant stream flow during fuel cell operation according to a natural exponential function.

20. The unitized regenerative fuel cell assembly of claim 19, wherein the width of said oxygen-side channel decreases according to a natural exponential function along substantially the entire length of said oxygen-side channel.

21. The unitized regenerative fuel cell assembly of claim 19 further comprising a second unit cell wherein said unit cell and said second unit cell are arranged in a stack.

* * * * *